United States Patent
Li et al.

(10) Patent No.: US 11,430,264 B2
(45) Date of Patent: Aug. 30, 2022

(54) EYE OPEN OR CLOSED STATE DETECTION METHOD AND ELECTRONIC DEVICE

(71) Applicant: Honor Device Co., Ltd., Guangdong (CN)

(72) Inventors: Hongbao Li, Shenzhen (CN); Chen Dong, Shenzhen (CN); Yongtao Jiang, Shenzhen (CN); Wenmei Gao, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 17 days.

(21) Appl. No.: 17/260,859

(22) PCT Filed: Sep. 18, 2018

(86) PCT No.: PCT/CN2018/106226
§ 371 (c)(1),
(2) Date: Jan. 15, 2021

(87) PCT Pub. No.: WO2020/015145
PCT Pub. Date: Jan. 23, 2020

(65) Prior Publication Data
US 2021/0264148 A1    Aug. 26, 2021

(30) Foreign Application Priority Data
Jul. 16, 2018    (CN) .......................... 201810776284.1

(51) Int. Cl.
*G06V 40/18*    (2022.01)
*G06K 9/62*    (2022.01)
(Continued)

(52) U.S. Cl.
CPC ......... *G06V 40/197* (2022.01); *G06K 9/6267* (2013.01); *G06V 10/457* (2022.01); *G06V 10/72* (2022.01); *G06V 40/193* (2022.01)

(58) Field of Classification Search
CPC .. G06V 40/197; G06V 40/193; G06V 10/457; G06V 10/72; G06V 10/507; G06K 9/6267
See application file for complete search history.

(56) References Cited

U.S. PATENT DOCUMENTS 5,455,601 A * 10/1995 Ozaki .................... G09G 5/399
                                                            345/158
5,878,156 A * 3/1999 Okumura ............... G08B 21/06
                                                            340/576
(Continued)

FOREIGN PATENT DOCUMENTS

CN    104091147 A    10/2014
CN    105117681 A    12/2015
(Continued)

OTHER PUBLICATIONS

Soukupova, T., et al., "Real-Time Eye Blink Detection using Facial Landmarks," 21st Computer Vision Winter Workshop, Feb. 3-5, 2016, 8 pages.
(Continued)

*Primary Examiner* — John B Strege
(74) *Attorney, Agent, or Firm* — Conley Rose, P.C.

(57) ABSTRACT

An eye open or closed state detection method, in addition to an eye opening feature, an iris shape feature and/or a vertical direction feature are added to identify the eye open or closed state, where the eye opening feature is used to represent an eye opening degree, the iris shape feature is used to represent a shape of an iris of an eye, and the vertical direction feature is used to represent a change degree of an eyelid curve.

17 Claims, 19 Drawing Sheets

(51) Int. Cl.
*G06V 10/44* (2022.01)
*G06V 10/72* (2022.01)

(56) References Cited

U.S. PATENT DOCUMENTS

| | | | | |
|---|---|---|---|---|
| 2007/0201724 | A1* | 8/2007 | Steinberg | G06V 10/98 348/E5.042 |
| 2009/0244274 | A1* | 10/2009 | Morita | G08B 21/06 348/78 |
| 2012/0002843 | A1* | 1/2012 | Yoda | B60K 28/06 382/103 |
| 2012/0219189 | A1* | 8/2012 | Wu | G06V 40/18 382/103 |
| 2012/0269442 | A1* | 10/2012 | Hermant-Santini | G06V 40/193 382/195 |
| 2013/0101225 | A1* | 4/2013 | Kadoya | G06V 10/451 382/199 |
| 2013/0142389 | A1* | 6/2013 | Shimura | G06V 40/197 382/103 |
| 2014/0078281 | A1* | 3/2014 | Tsou | G08B 21/06 348/78 |
| 2014/0078284 | A1* | 3/2014 | Tsou | A61B 3/113 348/78 |
| 2014/0161317 | A1* | 6/2014 | Hiramaki | G06V 20/597 382/103 |
| 2016/0048735 | A1* | 2/2016 | Ohya | G06T 7/90 348/78 |
| 2016/0124506 | A1* | 5/2016 | Hwang | G06F 3/017 345/156 |
| 2016/0262682 | A1* | 9/2016 | Omi | A61B 5/7455 |
| 2016/0379042 | A1* | 12/2016 | Bourlai | G06V 40/171 382/118 |
| 2018/0020156 | A1* | 1/2018 | Zobel | G06V 10/993 |
| 2019/0320890 | A1* | 10/2019 | Tahara | G06V 10/443 |
| 2021/0374443 | A1* | 12/2021 | Edwards | G06F 3/013 |

FOREIGN PATENT DOCUMENTS

| | | |
|---|---|---|
| CN | 105224285 A | 1/2016 |
| CN | 107133595 A | 9/2017 |
| EP | 2237551 A1 | 6/2010 |

OTHER PUBLICATIONS

Izzati, N., et al., "Analysis of Eye Closure Duration Based on the Height of Iris," 2016 6th IEEE International Conference on Control System, Computing and Engineering, Nov. 25-27, 2016, 6 pages.

Ibrahim, M., et al., "EYe Closure and Open Detection Using Adaptive Thresholding Histogram Enhancement (ATHE) Technique and Connected Components Utilisation," IEEE, 2014, 5 pages.

Cai, P., et al., "An Eyelid Detection Algorithm for the Iris Recognition," International Journal of Security and Its Applications, vol. 9, No. 5, 2015, 8 pages.

Punitha, A., et al., "Driver Eye State Detection Based on Minimum Intensity Projection Using Tree Based Classifiers," Intelligent systems technologies and applications, vol. 1, 2015, 9 pages.

* cited by examiner

Eye open state

Indeterminate state

Eye closed state

EYE OPEN OR CLOSED STATE DETECTION METHOD AND ELECTRONIC DEVICE

CROSS-REFERENCE TO RELATED APPLICATIONS

This application is a U.S. National Stage of International Patent Application No. PCT/CN2018/106226 filed on Sep. 18, 2018, which claims priority to Chinese Patent Application No. 201810776284.1 filed on Jul. 16, 2018, both of which are hereby incorporated by reference in their entireties.

TECHNICAL FIELD

This application relates to the field of image processing technologies, and in particular, to an eye open or closed state detection method and an electronic device.

BACKGROUND

In some applications that implement human-computer interaction by using an eye status, quick, accurate, and stable identification of an eye open or closed state is of great importance. In some applications, different instructions may be sent based on eye open and closed states, to perform different actions. Therefore, detecting an eye open or closed state of a user is of great importance for controlling human-computer interaction and avoiding a stimulus caused by an external environment to eyes.

Currently, during detection of an eye open or closed state of a user, generally, a face of the user is photographed by using a camera lens, eyes of the user are located by using a facial feature point identification algorithm, eye opening (a ratio of a longitudinal distance to a horizontal distance of an eye) features of the user are calculated, and eye statuses are determined based on a preset threshold. For example, when an eye opening is greater than the specified threshold, it is determined that an eye is in an open state, or when an eye opening is less than the specified threshold, it is determined that an eye is in a closed state. The eye opening is calculated based on the facial feature point identification algorithm. A current feature point identification algorithm has poor stability, and is usually interfered with by a light condition and an environmental factor. In addition, eye opening distributions of different users are slightly different. As a result, accuracy of determining an eye open or closed state merely by comparing an eye opening and a single threshold is relatively low.

SUMMARY

Embodiments of this application provide an eye open or closed state detection method and an electronic device, to resolve an existing problem of relatively low accuracy of determining an eye open or closed state merely by comparing an eye opening with a single threshold.

According to a first aspect, an embodiment of this application provides an eye open or closed state detection method, where the method may be applied to an electronic device, and includes: obtaining a grayscale image of an eye on a human face in a to-be-processed face image; extracting an eye feature in the grayscale image, where the eye feature includes an eye opening feature, the eye feature further includes an iris shape feature and/or a vertical direction feature, the eye opening feature is used to represent an eye opening degree, the iris shape feature is used to represent an iris shape of the eye, and the vertical direction feature is used to represent a change degree of an eyelid curve; and identifying an eye open or closed state based on the eye feature.

In this embodiment of this application, in addition to the eye opening feature, the iris shape feature and/or the vertical direction feature are added, to detect the eye open or closed state, so that compared with a solution in which only the eye opening feature is used, detection accuracy can be improved.

In a possible design of the first aspect, the iris shape feature in the eye feature may be extracted in the following manner: binarization processing is performed on the grayscale image to obtain a binarization image of the grayscale image; a convex set in a largest connected region of the binary image is obtained; distances, in a horizontal direction and a vertical direction of an image coordinate system, between every two pixels included in the convex set are obtained; a largest distance in the horizontal direction is determined from the obtained distances in the horizontal direction, and a largest distance in the vertical direction is determined from the obtained distances in the vertical direction; and the iris shape feature is determined based on the largest distance in the horizontal direction and the largest distance in the vertical direction, where the iris shape feature is a first ratio of the largest distance in the horizontal direction to the largest distance in the vertical direction, or a second ratio of the largest distance in the vertical direction to the largest distance in the horizontal direction, or a smaller value in the first ratio and the second ratio.

The foregoing design provides a simple and effective manner of extracting the iris shape feature in the eye feature.

In a possible design of the first aspect, the performing binarization processing on the grayscale image includes: traversing the grayscale image based on a specified rectangular window and a specified sliding step; determining an average pixel value of pixels in the rectangular window in each window location, to obtain a plurality of average pixel values; and performing binarization processing on the grayscale image by using a smallest pixel value in the plurality of average pixel values as a threshold.

A binarization threshold of an image is determined based on the image by using the foregoing design, so that compared with a solution in which one threshold is set for all images, accuracy of extracting the iris shape feature can be improved, thereby improving accuracy of detecting the eye open or closed state.

In a possible design of the first aspect, extracting a vertical direction feature in the eye feature includes: obtaining N smallest pixels in pixels included in the grayscale image, where the smallest pixel is a pixel having a smallest pixel value in pixels with a same horizontal coordinate in the image coordinate system, and N represents a quantity of selected horizontal coordinates; and obtaining the vertical direction feature based on vertical coordinates of the N smallest pixels.

The foregoing design provides a simple and effective manner of extracting the vertical direction feature in the eye feature.

In a possible design of the first aspect, the obtaining the vertical direction feature based on vertical coordinates of the N smallest pixels includes: obtaining an absolute value of a difference between vertical coordinates of every two pixels with adjacent horizontal coordinates in the N smallest pixels; determining a feature score corresponding to each absolute value; and using a sum of the feature scores corresponding to the absolute values as the vertical direction feature.

In a possible design of the first aspect, the determining a feature score corresponding to each absolute value includes:

if $A<V_j\leq B$, $\text{score}V_j=V_j-A$;

if $B<V_j\leq C$, $\text{score}V_j=k1*(V_j-A)$; or if $C<V_j$, $\text{score}V_j=k2*(V_j-A)$, where $V_j$ represents the absolute value, $\text{score}V_j$ represents the feature score corresponding to $V_j$, all of A, B, C, k1, and k2 are positive numbers, k1<k2, and A<B<C.

The foregoing manner of determining the feature score is simple and effective, and reduces complexity.

In a possible design of the first aspect, the identifying an eye open or closed state based on the eye feature includes: identifying the eye open or closed state based on the eye feature and a specified classification model, where the specified classification model is constructed in the following manner: grayscale images of eyes on human faces in M face images in a face image training library are obtained; the eye features respectively corresponding to the M grayscale images are extracted; and the classification model is constructed based on the eye features respectively corresponding to the M grayscale images and pre-marked eye open or closed states respectively corresponding to the M grayscale images.

The foregoing manner of identifying the eye open or closed state by using the pre-trained classification model is simple and effective, and has low complexity.

Based on the inventive idea the same as that of the first aspect, according to a second aspect, an embodiment of this application provides an eye open or closed state detection apparatus, including units configured to perform the method in the first aspect or any design of the first aspect.

According to a third aspect, an embodiment of this application provides an electronic device, including a processor and a memory. The processor is coupled to the memory. The memory is configured to store a program instruction. The processor is configured to read the program instruction stored in the memory, to implement the method in any one of the first aspect and the possible designs of the first aspect.

According to a fourth aspect, an embodiment of this application provides a computer storage medium. The computer storage medium stores a program instruction. When the program instruction is run on an electronic device, the electronic device is enabled to perform the method in any one of the first aspect and the possible designs of the first aspect.

According to a fifth aspect, an embodiment of this application provides a computer program product. When the computer program product is run on an electronic device, the electronic device is enabled to perform the method in any one of the first aspect and the possible designs of the first aspect.

According to a sixth aspect, an embodiment of this application provides a chip. The chip is coupled to a memory of an electronic device, to perform the method in any one of the first aspect and the possible designs of the first aspect.

In addition, for technical effects of the second aspect to the sixth aspect, refer to the descriptions in the first aspect. Details are not described herein again.

It should be noted that "coupling" in the embodiments of this application means that two components are directly or indirectly connected.

DESCRIPTION OF EMBODIMENTS

The embodiments disclosed in this application may be applied to an electronic device. In some embodiments of this application, the electronic device may be a portable electronic device having functions such as a personal digital assistant and/or a music player, for example, a mobile phone, a tablet computer, a wearable device (for example, a smartwatch) having a wireless communication function, or a vehicle-mounted device. An example embodiment of the portable electronic device includes, but not limited to, a portable electronic device using iOS®, Android®, Microsoft®, or another operating system. The foregoing portable electronic device may be alternatively a laptop (Laptop) having a touch-sensitive surface (for example, a touch panel) or the like. It should be further understood that in some other embodiments of this application, the electronic device may be a desktop computer having a touch-sensitive surface (for example, a touch panel).

Figure 1:
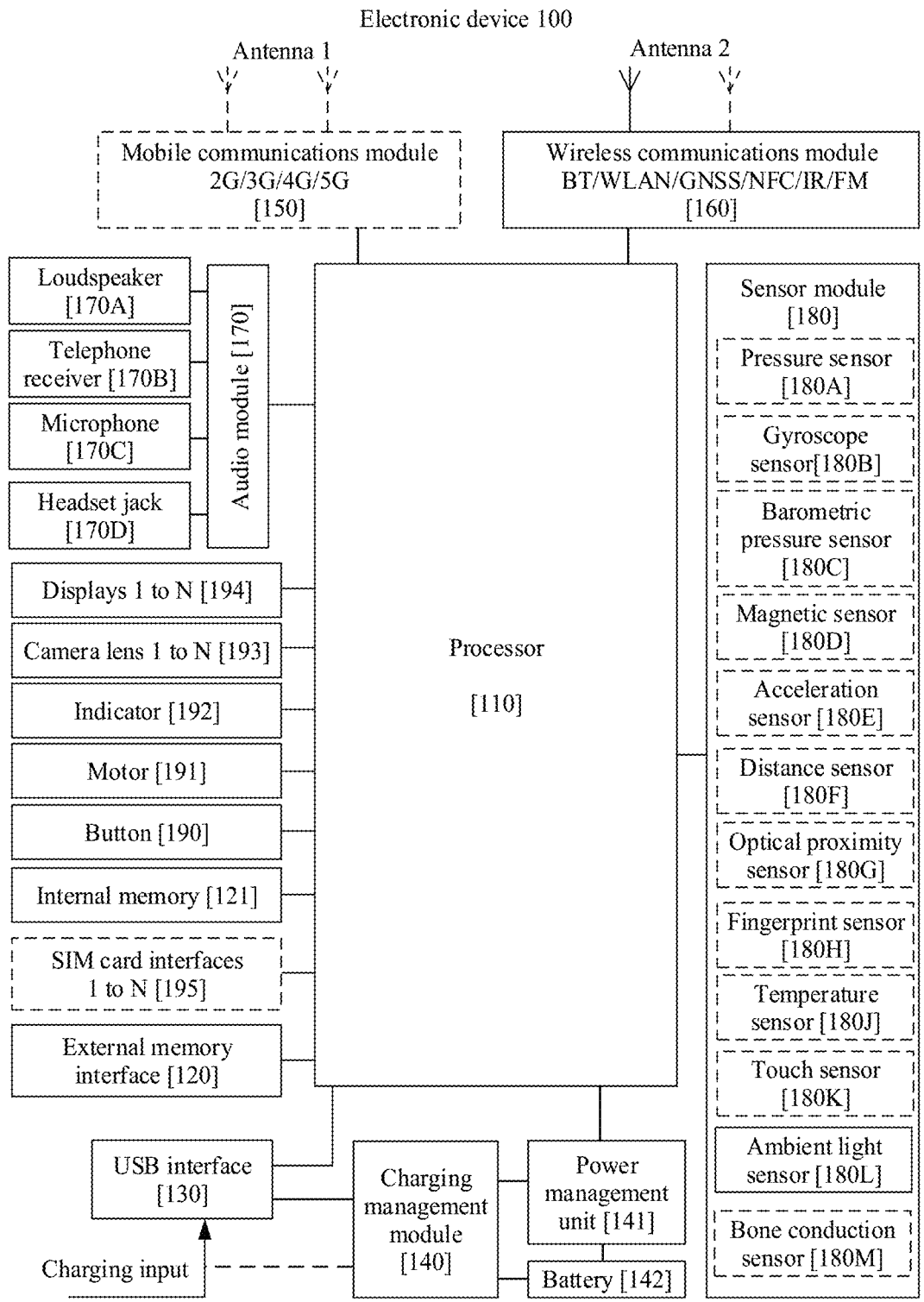
FIG. 1 is a schematic structural diagram of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management unit 141, a battery 142, an antenna 2, a wireless communications module 160, an audio module 170, a loudspeaker 170A, a telephone receiver 170B, a microphone 170C, a headset jack 170D, a sensor module 180, a button 190, a motor 191, an indicator 192, a camera lens 193, a display 194, and the like. The sensor module 180 includes an ambient light sensor 180L. In addition, the sensor module 180 may further include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, a bone conduction sensor 180M, and the like. In some other embodiments, the electronic device 100 in this embodiment of this application may further include an antenna 1, a mobile communications module 150, and a subscriber identity module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate components, or may be integrated into one or more processors.

In some embodiments, a memory may be further disposed in the processor 110, to store an instruction and data. For example, the memory in the processor 110 may be a cache. The memory may store an instruction or data that is just used or cyclically used by the processor 110. If the processor 110 needs to use the instruction or data again, the processor 110 may directly invoke the instruction or data from the memory, to avoid repeated access, reduce a waiting time of the processor 110, and improve system efficiency.

In some other embodiments, the processor 110 may further include one or more interfaces. For example, the interface may be a universal serial bus (universal serial bus, USB) interface 130. For another example, the interface may be alternatively an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, or the like. It may be understood that in this embodiment of this application, different modules of the electronic device 100 may be connected by using interfaces, so that the electronic device 100 can implement different functions, for example, photographing and processing. It should be noted that a manner of connection between interfaces in the electronic device 100 is not limited in this embodiment of this application.

The USB interface 130 is an interface conforming to a USB standard specification. For example, the USB interface 130 may include a mini USB interface, a micro USB interface, a USB type C interface, and the like. The USB interface 130 may be configured to connect to a charger to charge the electronic device 100, or may be configured to transmit data between the electronic device 100 and a peripheral device, or may be configured to connect to a headset, and play back audio by using the headset. The interface may be further configured to connect to another electronic device, for example, an AR device.

The charging management module 140 is configured to receive charging input from the charger. The charger may be a wireless charger or may be a wired charger. In some embodiments of wired charging, the charging management module 140 may receive charging input from a wired charger by using the USB interface 130. In some embodiments of wireless charging, the charging management module 140 may receive charging input from a wireless charger by using a wireless charging coil of the electronic device 100. When charging the battery 142, the charging management module 140 may further supply power to the electronic device by using the power management unit 141.

The power management unit 141 is configured to connect the battery 142, the charging management module 140, and the processor 110. The power management unit 141 receives input of the battery 142 and/or the charging management module 140, to supply power to the processor 110, the internal memory 121, an external memory, the display 194, the camera lens 193, the wireless communications module 160, and the like. The power management unit 141 may be further configured to monitor parameters such as a battery capacity, a quantity of cyclic times of the battery, and a battery health status (power leakage and impedance). In some other embodiments, the power management unit 141 may be further disposed in the processor 110. In some other embodiments, the power management unit 141 and the charging management module 140 may be further disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device 100 may be configured to cover a single communication frequency band or a plurality of communication frequency bands. Different antennas may be reused, to improve utilization of the antennas. For example, the antenna 1 may be reused as a diversity antenna of a wireless local area network. In some other embodiments, the antennas may be combined with a tuning switch for use.

The mobile communications module 150 may provide a solution of 2G/3G/4G/5G wireless communication and the like applied to the electronic device 100. The mobile communications module 150 may provide at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave and radiate the electromagnetic wave by using the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Subsequently, the demodulator transmits the low-frequency baseband signal obtained through demodulation to the baseband processor for processing. The low-frequency baseband signal is transmitted to the application processor after being processed by the baseband processor. The application processor outputs a voice signal by using an audio device (which is not limited to the loudspeaker 170A and the telephone receiver 170B), or displays an image or a video by using the display 194. In some embodiments, the modem processor may be a separate component. In some other embodiments, the modem processor may be independent of the processor 110, and may be disposed in a same component as the mobile communications module 150 or another function module.

The wireless communications module 160 may provide a solution of wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field wireless communication technology (near field communication, NFC), and an infrared technology (infrared, IR). The wireless communications module 160 may be one or more components integrating at least one communication processing module. The wireless communications module 160 receives an electromagnetic wave signal by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is an image processing microprocessor, and connects the display 194 and the application processor. The GPU is configured to perform mathematical and geometrical calculation, and is configured for graphics rendering. The processor 110 may include one or more GPUs, and execute a program instruction to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera lens 193, the video codec, the GPU, the display 194, the application processor, and the like.

The ISP is configured to process data fed back by the camera lens 193. For example, during photographing, a shutter is opened, light rays are transmitted to a light-sensitive element of the camera lens through a lens, an optical signal is converted into an electrical signal, and the light-sensitive element of the camera lens transmits the electrical signal to the ISP for processing, to convert the electrical signal into an image visible to naked eyes. The ISP may further perform algorithm optimization on noise, luminance, and complexion of an image. The ISP may further optimize parameters such as exposure and a color temperature of a photographing scenario. In some embodiments, the ISP may be disposed in the camera lens 193.

The camera lens 193 is configured to capture a static image or a video. For an object, an optical image is generated by using a lens and the image is projected to the light-sensitive element. The light-sensitive element may be a charge coupled device (charge coupled device, CCD) or a complementary metal-oxide-semiconductor (complementary metal-oxide-semiconductor, CMOS) photoelectric transistor. The light-sensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 100 may include one or N camera lenses 193, where N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding modes, for example, moving picture experts group (moving picture experts group, MPEG) 1, MPEG 2, MPEG 3, and MPEG 4.

The NPU is a neural-network (neural-network, NN) computing processor, and quickly processes input information by learning from a biological neural network structure, for example, by learning from a mode of transmission between brain nerve cells, and may further perform constant self-learning. An application of intelligent cognition of the electronic device 100, for example, image recognition, facial recognition, voice recognition, and text understanding, may be implemented by using the NPU.

The external memory interface 120 may be configured to connect to an external storage card, (for example, a Micro SD card), to extend a storage capability of the electronic device 100. The external storage card communicates with the processor 110 through the external memory interface 120, to implement a data storage function, for example, store a music file, a video file, and the like into the external storage card.

The internal memory 121 may be configured to store computer executable program code. The executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application required by at least one function (for example, a voice playback function or an image playback function), and the like. The data storage region may store data (for example, audio data or an address book) and the like created in a process of using the electronic device 100. In addition, the internal memory 121 may include a high-speed random access memory, or may include a non-volatile memory, for example, at least one magnetic disk storage component, a flash memory, or a universal flash storage (universal flash storage, UFS).

The electronic device 100 may implement an audio function, for example, music playback or recording, by using the audio module 170, the loudspeaker 170A, the telephone receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode or decode an audio signal. In some embodiments, the audio module 170 may be disposed in the processor 110, or some function modules of the audio module 170 are disposed in the processor 110.

The loudspeaker 170A, alternatively referred to as a "horn", is configured to convert an audio electrical signal into a voice signal. Music may be listened to or a call may be answered in a hands-free manner by using the loudspeaker 170A of the electronic device 100.

The telephone receiver 170B, alternatively referred to as an "earpiece", is configured to convert an audio electrical signal into a voice signal. When a call is answered or voice information is received by using the electronic device 100, the telephone receiver 170B may be put close to a human ear, to receive voice.

The microphone 170C, alternatively referred to as a "microphone" or a "mike", is configured to convert a voice signal into an electrical signal. When making a call or sending voice information, a user may speak with the mouth approaching the microphone 170C, to input a voice signal to the microphone 170C. At least one microphone 170C may be disposed in the electronic device 100. In some other embodiments, two microphones 170C may be disposed in the electronic device 100, so that not only a voice signal is captured, but also a noise cancellation function can be implemented. In some other embodiments, three, four, or more microphones 170C may be alternatively disposed in the electronic device 100, to collect a voice signal, cancel noise, recognize a voice source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface, a cellular telecommunications industry association of the USA (cellular telecommunications industry association of the USA, CTIA) standard interface, or the like.

The pressure sensor 180A is configured to sense a pressure signal, and may convert a pressure signal into an electrical signal. In some embodiments, the pressure sensor 180A may be disposed in the display 194. There is a plurality of types of pressure sensors 180A, for example, a resistive pressure sensor, an inductive pressure sensor, and a capacitive pressure sensor. The capacitive pressure sensor may include at least two parallel plates having conductive materials. When force acts on the pressure sensor 180A, a capacitance between electrodes changes. The electronic device 100 determines strength of pressure based on a change of the capacitance. When a touch operation acts on the display 194, the electronic device 100 detects strength of the touch operation by using the pressure sensor 180A. The electronic device 100 may further calculate a touch position based on a detection signal of the pressure sensor 180A. In some embodiments, touch operations that act on a same touch position with different touch operation strength may correspond to different operation instructions. For example, when a touch operation whose touch operation strength is less than a first pressure threshold acts on an icon of a short message service application, an instruction of checking a short message service message is executed. When a touch operation whose touch operation strength is greater than or equal to the first pressure threshold acts on the icon of the short message service application, an instruction of creating a new short message service message is executed.

The gyroscope sensor 180B may be configured to determine a motion gesture of the electronic device 100. In some embodiments, the gyroscope sensor 180B may determine angular velocities of the electronic device 100 around three axes (that is, an x axis, a y axis, and a z axis). The gyroscope sensor 180B may be configured for image stabilization of photographing. For example, when a shutter is pressed, the gyroscope sensor 180B detects a jittering angle of the electronic device 100, calculates, based on the angle, a distance with which a lens module needs to make compensation, and enables the lens to make reverse motion to cancel jittering of the electronic device 100, to implement image stabilization. The gyroscope sensor 180B may be further used in scenarios of navigation and motion sensing games.

The barometric pressure sensor 180C is configured to measure barometric pressure. In some embodiments, the electronic device 100 calculates an altitude by using the barometric pressure measured by the barometric pressure sensor 180C, to assist in locating and navigation.

The magnetic sensor 180D includes a Hall sensor. The electronic device 100 may detect opening or closing of a flip leather case by using the magnetic sensor 180D. In some embodiments, when the electronic device 100 is a flip device, the electronic device 100 may detect opening or closing of a flip cover by using the magnetic sensor 180D, to set a feature of the flip cover, for example, automatic unlocking, based on a detected open or closed state of the leather cover or a detected open or closed state of the flip cover.

The acceleration sensor 180E may detect magnitude of acceleration of the electronic device 100 in various directions (generally on three axes). The acceleration sensor 180E may detect magnitude and a direction of gravity when the electronic device 100 is static, and may be further configured to recognize attitude of the electronic device, applied to switching between landscape orientation and portrait orientation, and applied to an application such as a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device 100 may emit infrared light to the outside by using the light emitting diode. The electronic device 100 detects infrared reflected light from a near object by using the photodiode. When plenty of reflected light is detected, it may be determined that there is an object near the electronic device 100. When insufficient reflected light is detected, the electronic device 100 may determine that no object is near the electronic device 100. The electronic device 100 may detect, by using the optical proximity sensor 180G, that the user holds the electronic device 100 and enables the electronic device 100 to approach the ear for calling, so that the display is automatically turned off, to save power. The optical proximity sensor 180G may be further configured to automatically unlock or lock the display in a leather cover mode and a pocket mode.

The ambient light sensor 180L is configured to sense luminance of ambient light. The electronic device 100 may adaptively adjust luminance of the display 194 based on the sensed luminance of the ambient light. The ambient light sensor 180L may be further configured to automatically adjust white balance during photographing. The ambient light sensor 180L may further cooperate with the optical proximity sensor 180G, to detect whether the electronic device 100 is in a pocket, to prevent touch made by mistake.

The fingerprint sensor 180H is configured to collect a fingerprint. The electronic device 100 may implement fingerprint unlock, application access lock, fingerprint photographing, call answering using a fingerprint, and the like by using the collected fingerprint feature.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor located near the temperature sensor 180J, to reduce power consumption and implement overheat protection. In some other embodiments, when the temperature is lower than another threshold, the electronic device 100 heats the battery 142, to avoid abnormal shutdown of the electronic device 100 caused due to a low temperature. In some other embodiments, when the temperature is lower than still another threshold, the electronic device 100 increases an output voltage of the battery 142, to avoid abnormal shutdown caused due to a low temperature.

The touch sensor 180K is alternatively referred to as a "touch panel". The touch sensor 180K may be disposed in the display 194, and the touch sensor 180K and the display 194 form a touchscreen, alternatively referred to as a "touch panel". The touch sensor 180K is configured to detect a touch operation on or near the display. The touch sensor may transmit the detected touch operation to the application processor, to determine a touch event type. The touch sensor may provide, by using the display 194, visual output related to the touch operation. In some other embodiments, the touch sensor 180K may be alternatively disposed on a surface of the electronic device 100, and is located in a position different from that of the display 194.

The bone conduction sensor 180M may obtain a vibration signal. In some embodiments, the bone conduction sensor 180M may obtain a vibration signal of a vibrating bone of a human vocal cord part. The bone conduction sensor 180M may contact a human pulse, and receive a blood pressure signal. In some embodiments, the bone conduction sensor 180M may be alternatively disposed in a headset, to form a bone conduction headset. The audio module 170 may parse out a voice signal based on the vibration signal that is of the vibration bone of the vocal cord part and that is obtained by the bone conduction sensor 180M, to implement a voice function. The application processor may parse out heart rate information based on the blood pressure signal obtained by the bone conduction sensor 180M, to implement a heart rate detection function.

The button 190 may include a power button, a volume button, and the like. The button 190 may be a mechanical button, or a touch button. The electronic device 100 may receive a button input, and generate a button signal input related to user setting and function control of the electronic device 100.

The motor 191 may generate a vibrating alert. The motor 191 may be configured to provide a calling vibrating alert, and may be further configured to provide vibration feedback of a touch. For example, touch operations acting on different applications (for example, photographing and audio playback) may correspond to different vibration feedback effects. For touch operations acting on different regions of the display 194, the motor 191 may also generate different corresponding vibration feedback effects. Different application scenarios (for example, a time reminder, information receiving, an alarm clock, and a game) may also correspond to different vibration feedback effects. A vibration feedback effect of a touch may be also customized.

The indicator 192 may be an indicator light, may be configured to indicate a charging state and a battery level change, and may be further configured to indicate a message, a missed call, a notification, and the like.

The SIM card interface 195 is configured to connect to a SIM card. The SIM card may be inserted into the SIM card interface 195, or removed from the SIM card interface 195, to contact and be separated from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be also compatible with an external storage card. The electronic device 100 interacts with a network by using a SIM card, to implement functions such as calling and data communication. In some embodiments, the electronic device 100 uses eSIM, namely, an embedded SIM card. The eSIM card may be embedded into the electronic device 100, and cannot be separated from the electronic device 100.

It may be understood that the example of the structure in this embodiment of this application does not specifically limit the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

In addition, it should be noted that in this application "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular form or a plural form. The character "/" generally indicates an "or" relationship between the associated objects. "At least one of the following items" or a similar expression means any combination of the items, including a single item or any combination of a plurality of items. For example, at least one of a, b, or c may represent a, b, c, a-b, a-c, b-c, or a-b-c, where a, b, c each may be a single item or may be a plurality of items. In addition, it should be understood that in the descriptions of this application, terms such as "first" and "second" are merely used to distinguish between descriptions, but cannot be understood as indicating or implying relative importance, and cannot be understood as indicating or implying a sequence.

The embodiments of this application are described, in detail below, by using the electronic device 100 as an example.

In addition, it should be understood that applications supported by the electronic device in the embodiments of this application may include a photographing application such as a camera. In addition, the applications supported by the electronic device may further include a plurality of other applications such as a drawing application, a game application, a telephone application, a video player application, a music player application, a photo manager application, a browser application, a calendar application, and a clock application.

Figure 2:
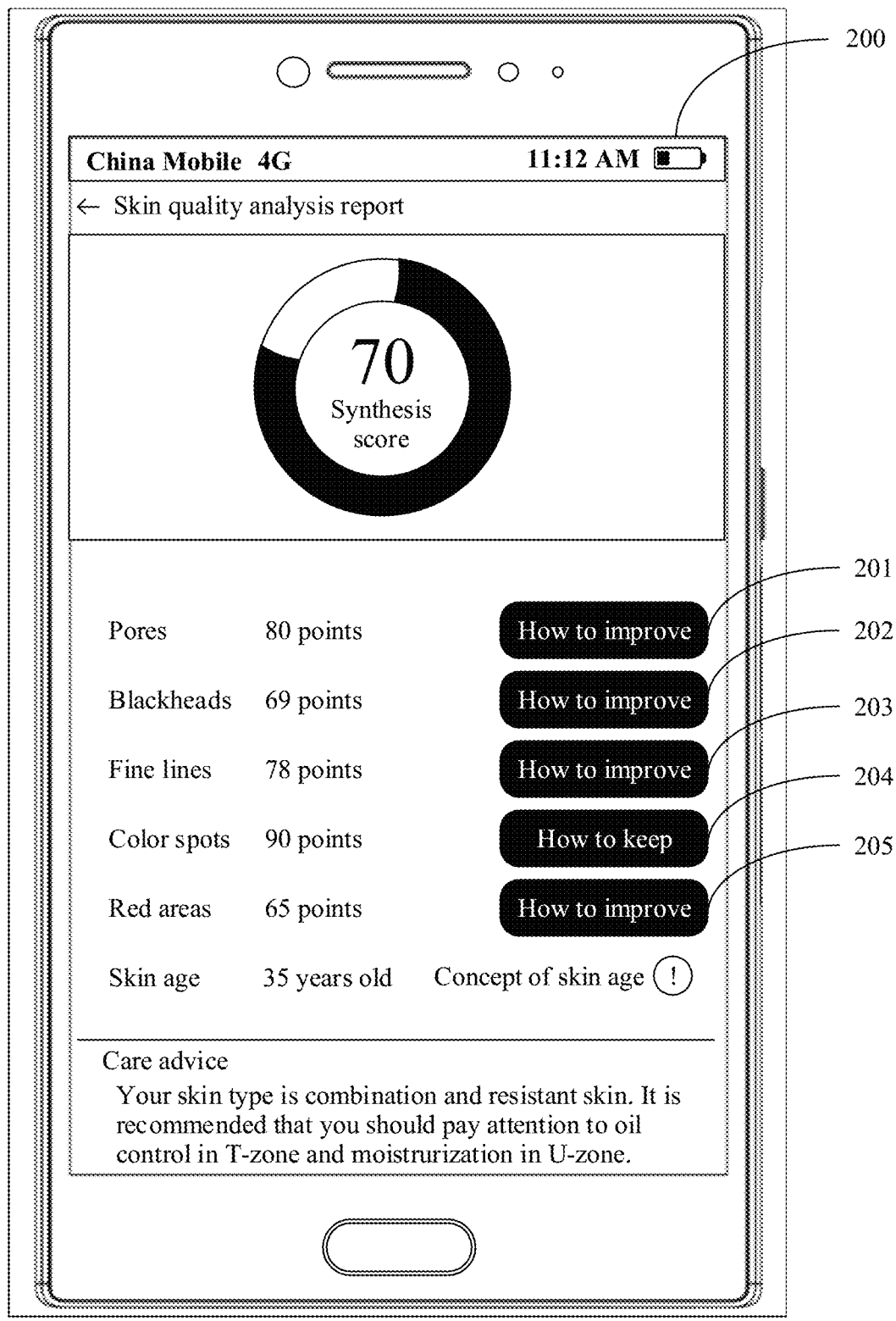
FIG. 2 is a schematic diagram of a user interface according to an embodiment of this application.

The applications supported by the electronic device in the embodiments of this application may further include an application used for skin detection. The application used for skin detection detects a feature of facial skin (for example, wrinkles, pores, black heads, colored patches, and a red region on the facial skin) of a user by using a face image that is taken, and may provide a detection result report for the user. For example, the detection result report may include, but not limited to, a score of each feature of the facial skin and a comprehensive analysis of the facial skin, and the face image of the user may be further presented, and a corresponding problem is marked on the face image based on a detection result of each feature, for example, blackheads are marked on the tip of the nose, wrinkles are marked on the forehead, and colored patches are marked on the cheeks. It may be understood that the detection result report may be presented to the user by using a user interface. For example, the detection result report may include a comprehensive score, a skin age, and scores of the pores, the black heads, the wrinkles, the colored patches, and the red regions, as shown on a user interface 200 in FIG. 2. In some other embodiments, the user interface 200 may further include a virtual button 201, a virtual button 202, a virtual button 203, a virtual button 204, and a virtual button 205. The virtual button 201 is used as an example. The electronic device 100 displays specific care advice on the pores on the display 194 in response to an operation on the virtual button 201. For functions of the virtual button 202, the virtual button 203, the virtual button 204, and the virtual button 205, refer to the function of the virtual button 201. Details are not described herein again.

In order that the electronic device more accurately detects the facial skin of the user, for example, in a user skin detection solution in the embodiments of this application, a photographing condition detection module, an image quality detection module, a region of interest (region of interest, ROI) detection module, a skin feature detection module, a result analysis module, and the like may be integrated into the processor 110. In some embodiments, the photographing condition detection module, the image quality detection module, the region of interest (region of interest, ROI) detection module, the skin feature detection module, the result analysis module, and the like may be integrated into the application processor of the processor 110. In some other embodiments, an artificial intelligence (artificial intelligence, AI) chip is integrated into the processor 110, and the photographing condition detection module, the image quality detection module, the region of interest (region of interest, ROI) detection module, the skin feature detection module, the result analysis module, and the like may be integrated into the AI chip, to implement user skin detection.

The photographing condition detection module may detect a current photographing condition, to instruct the user to perform photographing in a required photographing condition, to ensure that an image that is taken meets a requirement, thereby ensuring accuracy of image-based skin detection. For example, the required photographing condition includes: there is plenty of ambient lighting, a distance between a human face and the electronic device is appropriate (for example, the distance is about 25 cm), the face is regular, eyes are open or closed, the user does not wear a pair of glasses, no bang hangs over the forehead as far as possible, focusing is accurate, there is no obvious jittering, and the like.

After the photographing condition detection module succeeds in detection, the processor 110 enables intelligent light filling. For example, when a current photographing condition meets a requirement, the photographing condition detection module determines that detection succeeds. Specifically, the electronic device in the embodiments of this application may use different fill light modes (for example, a flash mode and a flashlight mode), to perform light filling for the face of the user, to meet requirements of detecting different facial skin features. After light filling is performed for the face of the user, the processor 110 can control the camera lens 193 to photograph the face of the user to obtain the face image of the face of the user.

The image quality detection module may detect quality of the face image, to ensure that the image that is taken meets the requirements of detecting different facial skin features.

The ROI detection module may determine a to-be-detected ROI on the face image after the image quality detection module detects that the quality of the image meets a requirement, for example, an ROI of black heads is a small region on the tip of the nose.

The skin feature detection module may detect facial skin features in the determined ROI, for example, detect wrinkles, pores, black heads, colored patches, and red regions on the skin, and an oily degree of the skin.

The result analysis module may analyze a result of detecting, by the skin feature detection module, the facial skin features, and provide a score of each detection item, a score sequence, and the like of the skin features.

In addition, in some embodiments, the processor 110 may further integrate an image preprocessing module. The image preprocessing module may perform compression, cropping, and the like on the face image that is taken, so that the ROI detection module, the skin feature detection module, and the like perform subsequent processing.

To output a face image analysis result, or output the score of each detection item, or the like, the processor 110 may further display the obtained detection report (including regions that are on the face image and that correspond to the detection results of the features, and the scores of the detection items, for example, the black heads are marked on the tip of the nose, the wrinkles are marked on the forehead, and the colored patches are marked on the cheeks) on the display 194 for the user to view, thereby improving user experience.

When the embodiments of this application are applied to user skin detection, during photographing, because a flashlight emits light having relatively high illuminance to a face of a user, to avoid a strong light stimulus to eyes of the user, the embodiments of this application provide an eye open or closed state detection method and a terminal device. Before a photo is taken by using a camera lens, it is detected, by using the solution provided in the embodiments of this application, whether the eyes of the user are in an open state or a closed state, and if it is detected that the user eyes are in the open state, the user is prompted to close the eyes, to improve use experience of the user.

The embodiments of this application may be further applied to a scenario of photographing a person. During photographing, a user should be in an eye open state. Therefore, after the user triggers a photographing instruction, before a photo is taken by using a camera lens, it is detected, by using the solution provided in the embodiments of this application, whether the eyes of the user are in the open state or a closed state, and if it is detected that the eyes of the user are in the eye closed state, no photographing action is performed, or if it is detected that the eyes of the user are in the eye open state, a photo is taken.

Figure 3A:
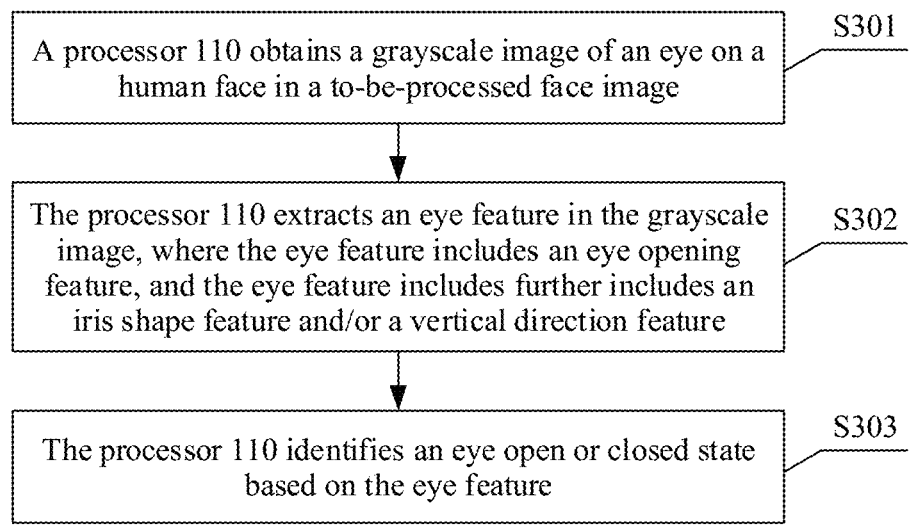
FIG. 3A is a flowchart of an eye open or closed state detection method according to an embodiment of this application.

FIG. 3A is a schematic flowchart of an eye open or closed state detection method according to an embodiment of this application. The method includes the following steps. The eye open or closed state detection method may be performed by the processor 110 of the electronic device 100. For example, when the processor 110 displays a photographing preview interface on the display 194, the photographing preview interface is used to display an image captured by using a camera lens, to detect an eye open or closed state based on the image that is captured by using the camera lens and that is displayed on the photographing preview interface. For example, the processor 110 invokes the camera lens to capture the image, and instruct the display 194 to display, on the photographing preview interface, the image captured by using the camera lens. The processor 110 performs, for the image, the following process of the eye open or closed state detection method.

S301. The processor 110 obtains a grayscale image of an eye on a human face in a to-be-processed face image.

Figure 3B:
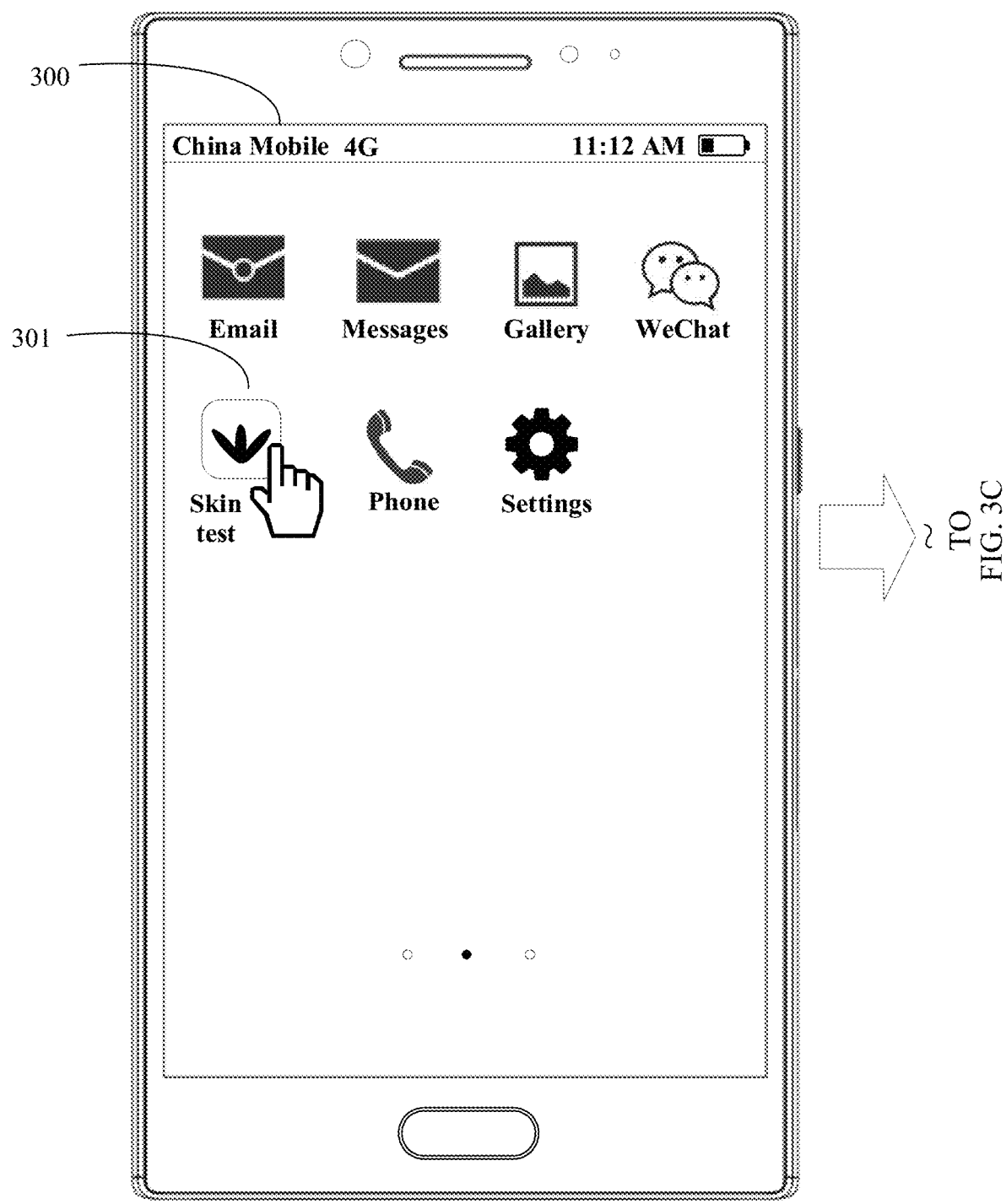
FIG. 3B to FIG. 3D are schematic diagrams of an application interface according to an embodiment of this application.
Figure 3C:
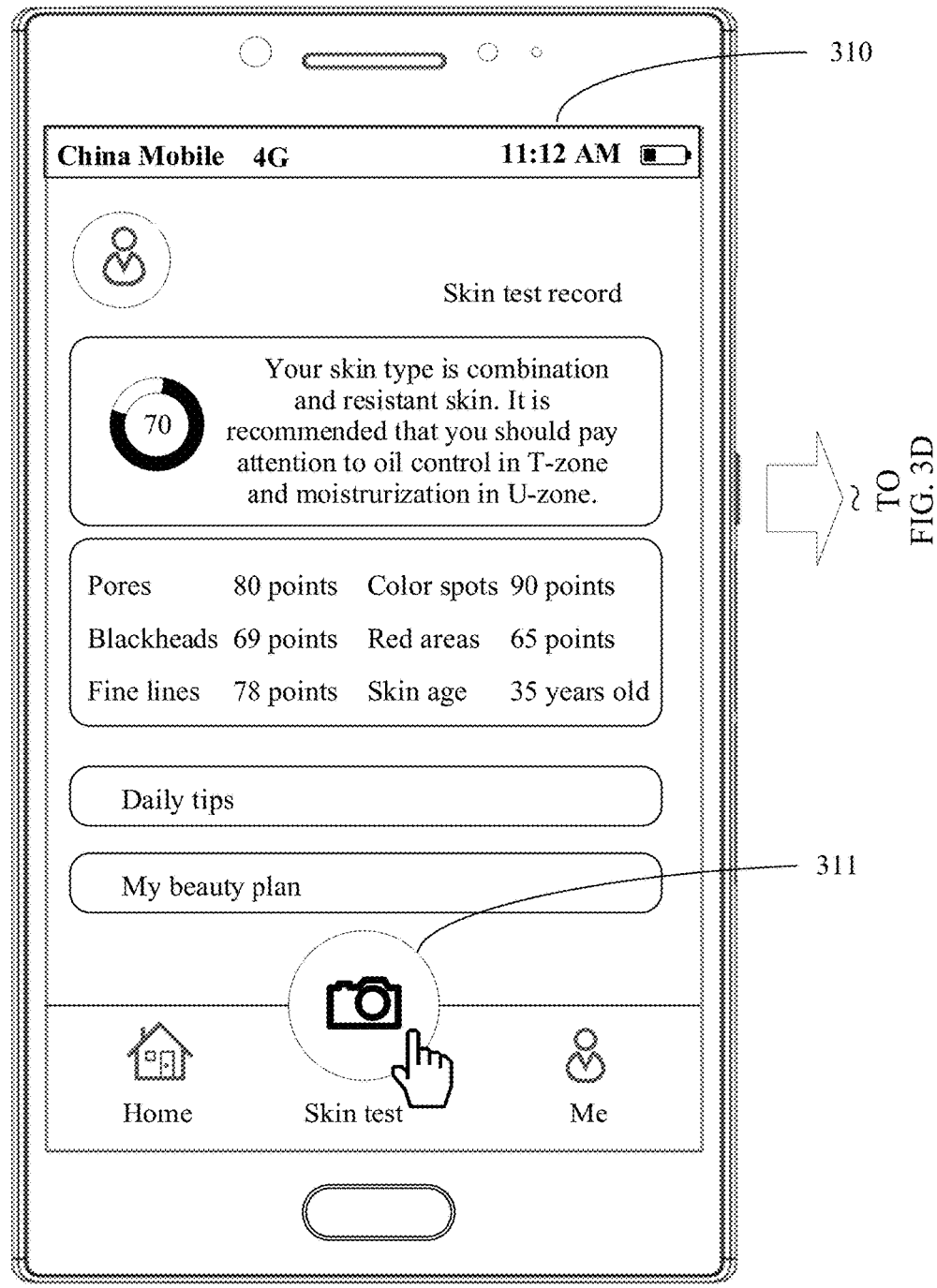
Figure 3D:
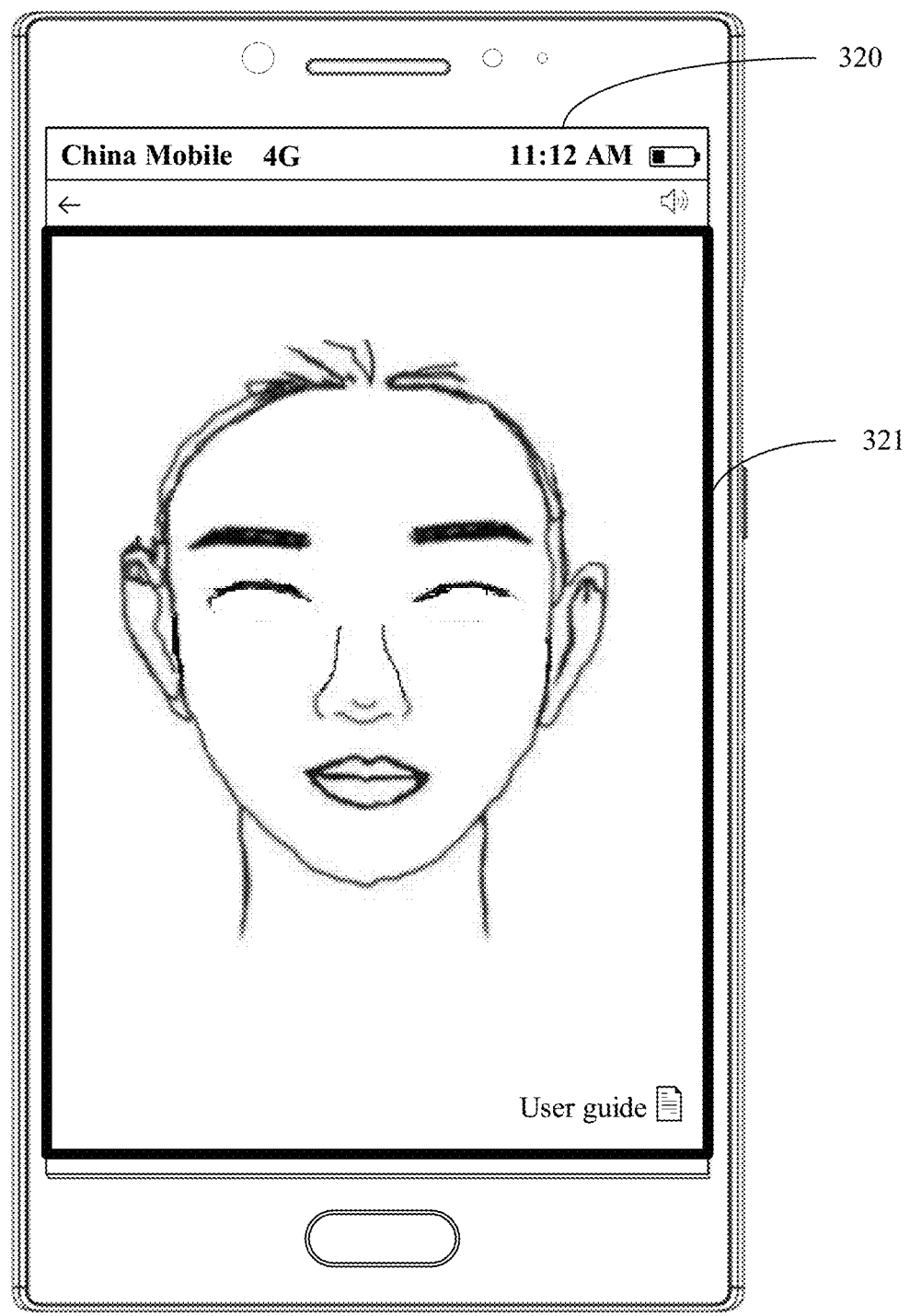

In a possible example, a skin detection method provided in an embodiment of this application may be applied to a skin test application. As shown in FIG. 3B to FIG. 3D, the display 194 of the electronic device 100 displays an icon 300 of the skin test application. If the electronic device 100 detects an operation on the icon 300, the electronic device 100 displays a user interface 310 of the skin test application on the display 194 in response to the operation on the icon 300. The user interface 310 of the skin test application includes a skin test button 311. If the electronic device 100 detects an operation on the skin test button 311, the electronic device 100 displays a photographing preview interface 320 of a camera application on the display 194 in response to the operation on the skin test button 311. The photographing preview interface 320 is used to display an image captured by using the camera lens 193. For example, the photographing preview interface 320 may include a preview region 321, and the preview region 321 is used to display the image captured by using the camera lens 193. It should be understood that the image that is captured by using the camera lens 193 and that is displayed in the preview region 321 may be the to-be-processed face image in this embodiment of this application. In addition, the camera lens 193 may be a front-facing camera lens of the electronic device 100, or may be a rear-facing camera lens of the electronic device 100. In some embodiments, to improve photographing quality, when resolution of the front-facing camera lens is lower than resolution of the rear-facing camera lens, the camera lens 193 is the rear-facing camera lens of the electronic device 100.

It should be noted that the skin test button 311 in this embodiment of this application may be alternatively referred to as a photographing button, and a name of the skin test button 311 is not limited in this embodiment of this application.

In another possible example, the face image may be read from the internal memory 121 or read from an external memory by using the external memory interface 120. In this case, the face image may be a face image that is taken in advance and that is stored in the internal memory 121 or the external memory.

When a video stream or an image including human face information is obtained, human face feature point information is obtained by using a human face feature point identification library, then rectangular regions of eyes on left and right parts of a human face are obtained through positioning by using feature points near the eyes, and grayscale transformation is performed on eye images in the rectangular regions of the eyes on the left and right parts of the human face, to obtain grayscale images of the eyes on the human face.

S302. The processor 110 extracts an eye feature in the grayscale image, where the eye feature includes an eye opening feature, and the eye feature further includes an iris shape feature and/or a vertical direction feature. The eye opening feature is used to represent an eye opening degree, the iris shape feature is used to represent an iris shape of an eye, and the vertical direction feature is used to represent a change degree of an eyelid curve.

S303. The processor 110 identifies an eye open or closed state based on the eye feature. In this embodiment of this application, in addition to the eye opening feature, the iris shape feature and/or the vertical direction feature are added, so that the eye open or closed state is identified by using a plurality of features, thereby improving detection accuracy.

In a possible implementation, the eye open or closed state may be identified based on the eye feature in the following manner:

identifying the eye open or closed state based on the eye feature and a specified classification model, where the specified classification model is constructed in the following manner:

obtaining grayscale images of eyes on human faces in M face images in a face image training library;

extracting the eye features respectively corresponding to the M grayscale images; and constructing the classification model based on the eye features respectively corresponding to the M grayscale images and premarked eye open or closed states respectively corresponding to the M grayscale images.

For example, the classification model may be a support vector machine (support vector machine, SVM) model, a neural network model, a random separation model, a logistic regression model, or the like. The classification model is not specifically limited in this application.

Figure 4:
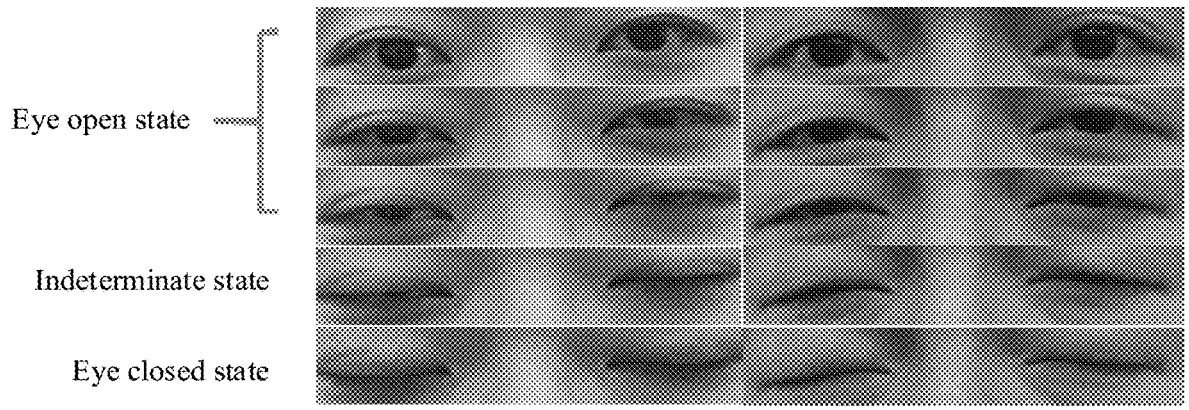
FIG. 4 is a schematic diagram of eye states according to an embodiment of this application.

Before an eye open or closed state is marked on a face image in the face image training library, the applicants find, through research, that there are three states in a process from when an eye is opened to when an eye is closed: an eye open state, an eye closed state, and an indeterminate state, as shown in FIG. 4. Specifically, boundary values of three cases are determined through an experiment in this embodiment of this application. It is found from an experiment result that the indeterminate state of the eye is an instantaneous state, and is not considered in an actual prediction process. The following quantitative indexes of the three states are obtained through quantitative measurement:

In the eye open state, a distance between upper and lower eyelids accounts for more than 25% of a complete open distance between the upper and lower eyelids.

In the eye closed state, a distance between the upper and lower eyelids accounts for less than 20% of the complete open distance between the upper and lower eyelids.

The indeterminate state is between the eye open state and the eye closed state.

In FIG. 4, eye images in a first line present a complete open state of the eyelids (accounting for 100%), and in a second line, each of distances between upper and lower eyelids accounts for about 70% of the complete open distance between the eyelids, and 70% is greater than 25%. Therefore, the foregoing two eye statuses are the eye open state. Determining of the eye open or closed state in this application mainly focuses on determining of the eye open state and the eye closed state. The eye open or closed state is marked on the face image in the face image training library in the foregoing manner.

Figure 5A:
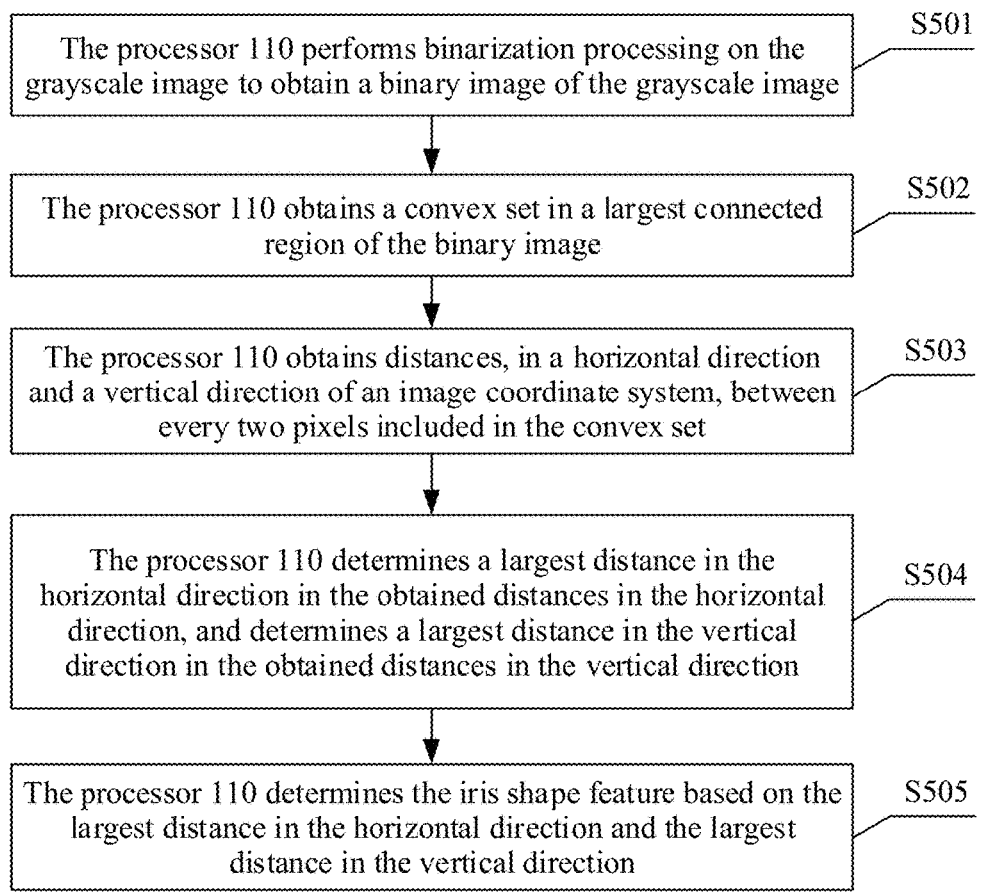
FIG. 5A is a flowchart of extracting an iris feature according to an embodiment of this application.
Figure 5B:
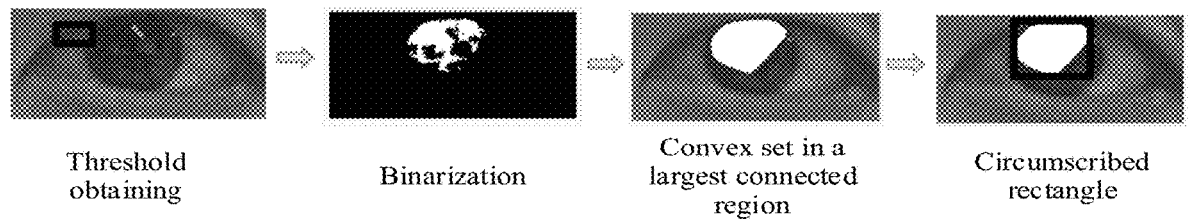
FIG. 5B is a schematic flowchart of extracting an iris feature according to an embodiment of this application.

The following describes in detail a process of extracting the iris shape feature in the eye feature, as shown in FIG. 5A and FIG. 5B.

S501. The processor 110 performs binarization processing on the grayscale image, to obtain a binary image of the grayscale image.

During binarization processing on the grayscale image, in a first possible implementation, binarization processing may be performed on the grayscale image based on a specified threshold, and in a second possible implementation, a threshold may be determined based on the grayscale image, to perform binarization processing on the grayscale image.

Referring to threshold obtaining in FIG. 5B, the threshold may be determined based on the grayscale image in the following manner:

A1. The processor 110 traverses the grayscale image based on a specified rectangular window and a specified sliding step.

A2. The processor 110 determines an average pixel value of pixels in the rectangular window in each window location, to obtain a plurality of average pixel values.

Figure 5C:
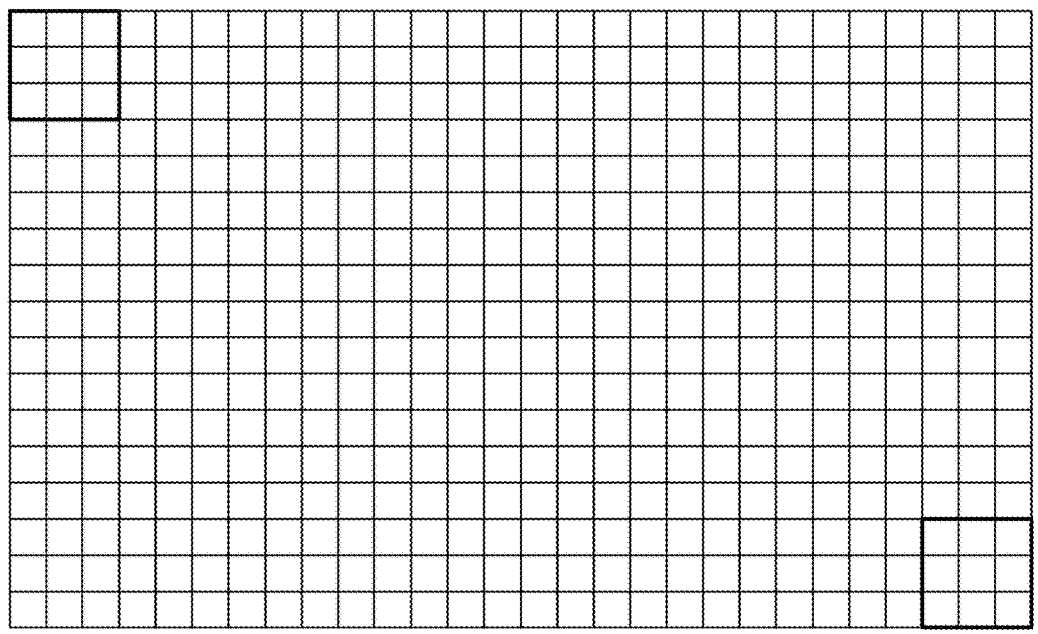
FIG. 5C is a schematic diagram of window traversal according to an embodiment of this application.

As shown in FIG. 5C, for example, the rectangular window is 3*3, and the sliding step is one pixel. The grayscale image is scanned by using the rectangular window. Each time the processor 110 slides on the obtained grayscale image based on the rectangular window, the processor 110 calculates an average pixel value of nine pixels in the window until all pixels in the grayscale image are scanned.

A3. The processor 110 uses a smallest pixel value in the plurality of average pixel values as a threshold, to perform binarization processing on the grayscale image based on the threshold.

S502. The processor 110 obtains a convex set in a largest connected region of the binary image.

S503. The processor 110 obtains distances, in a horizontal direction and a vertical direction of an image coordinate system, between every two pixels included in the convex set.

S504. The processor 110 determines a largest distance in the horizontal direction in the obtained distances in the horizontal direction, and determines a largest distance in the vertical direction in the obtained distances in the vertical direction.

For example, when obtaining the largest distance in the horizontal direction and the largest distance in the vertical direction in the convex set, the processor 110 may further calculate a circumscribed rectangle of the convex set of the largest connected region, to calculate a length and a width of the circumscribed rectangle to determine the largest distance in the horizontal direction and the largest distance in the vertical direction, referring to the circumscribed rectangle in FIG. 5B.

S505. The processor 110 determines the iris shape feature based on the largest distance in the horizontal direction and the largest distance in the vertical direction.

The iris shape feature is a first ratio of the largest distance in the horizontal direction to the largest distance in the vertical direction, or a second ratio of the largest distance in the vertical direction to the largest distance in the horizontal direction, or a smaller value in the first ratio and the second ratio.

For example, when the smaller value in the first ratio and the second ratio is used as the iris shape feature, the iris shape feature may be determined by using the following formula (1):

$$\text{feature1} = \min\left(\frac{x}{y}, \frac{y}{x}\right), \tag{1}$$

where feature1 represents the iris shape feature, x represents the largest distance in the horizontal direction, and y represents the largest distance in the vertical distance.

Figure 6A:
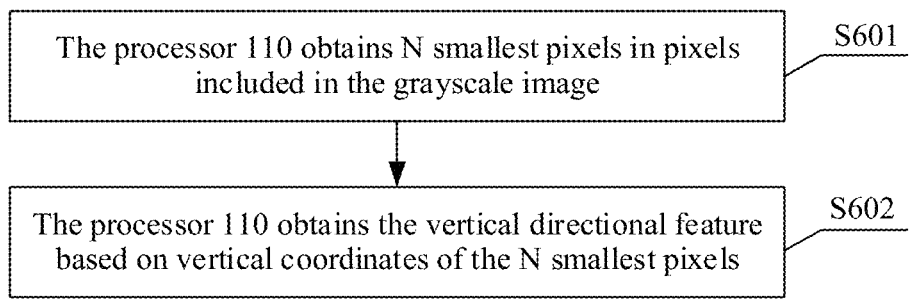
FIG. 6A is a flowchart of extracting a vertical direction feature according to an embodiment of this application.

The following describes in detail a process of extracting the vertical direction feature of the eye in the eye feature, as shown in FIG. 6A.

S601. The processor 110 obtains N smallest pixels in pixels included in the grayscale image. The smallest pixel is a pixel having a smallest pixel value in pixels with a same horizontal coordinate in the image coordinate system, and N represents a quantity of selected horizontal coordinates.

Figure 6B:
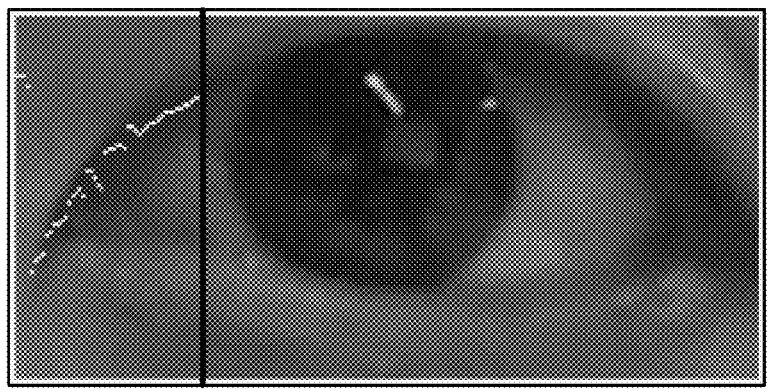
FIG. 6B is a schematic flowchart of extracting a vertical direction feature according to an embodiment of this application.

For example, as shown in FIG. 6B, when obtaining the N smallest pixels in the pixels included in the grayscale image, for example, the grayscale image includes M*N pixels, the processor 110 may obtain a pixel having a smallest pixel value in each of the N columns of pixels or each of I columns in the N columns of pixels in the grayscale image, for example, a pixel having a smallest pixel value in a column of pixels indicated by a black line in FIG. 6B. White points in FIG. 6B are locations of pixels having smallest pixel values in corresponding vertical directions. For example, when obtaining the N smallest pixels in the pixels included in the grayscale image, the processor 110 may further set a scanning line in the vertical direction, scan the grayscale image based on a step, and obtain a smallest pixel in pixel values that are scanned by using the scanning line during each scanning. The white points in FIG. 6B are the locations of the pixels having the smallest pixel values in the corresponding vertical directions.

S602. The processor 110 obtains the vertical direction feature based on vertical coordinates of the N smallest pixels.

In a possible example, the vertical direction feature may be obtained based on the vertical coordinates of the N smallest pixels in the following manner.

B1. The processor 110 obtains an absolute value of a difference between vertical coordinates of every two pixels with adjacent horizontal coordinates in the N smallest pixels.

Figure 6C:
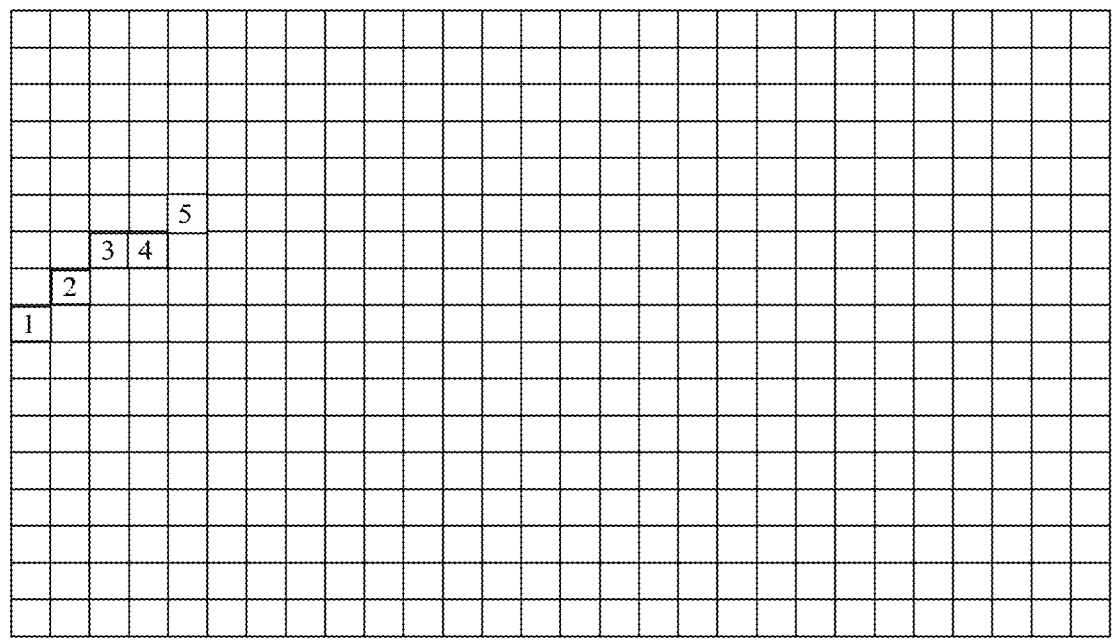
FIG. 6C is a schematic diagram of determining an absolute value according to an embodiment of this application.

For example, as shown in FIG. 6C, determined smallest pixels corresponding to the first five columns are respectively locations indicated by 1 to 5. Pixels indicated by 1 and 2 are pixels with adjacent horizontal coordinates. An absolute value $V_1$ of a difference between vertical coordinates of the two pixels with adjacent horizontal coordinates may be represented as $V_1=abs(Y_2-Y_1)$ or $V_1=|Y_2-Y_1|$. An absolute value $V_2$ of a difference between vertical coordinates of pixels indicated by 2 and 3 may be represented as $V_2=abs(-Y_2)$, or $V_2=|Y_3-Y_2|$, and so on. An absolute value of a difference between vertical coordinates of two pixels with adjacent horizontal coordinates is $V_j=|Y_{j+1}-Y_j|$.

B2. The processor 110 determines a feature score corresponding to each absolute value.

B3. The processor 110 uses a sum of the feature scores corresponding to the absolute values as the vertical direction feature.

In a possible example, the processor 110 may determine, in the following manner, the feature score corresponding to each absolute value:

if $A<V_j\leq B$, $scoreV_j=V_j-A$;

if $B<V_j\leq C$, $scoreV_j=k1*(V_j-A)$; or if $C<V_j$, $scoreV_j=k2*(V_j-A)$, where $V_j$ represents a $j^{th}$ absolute value, $scoreV_j$ represents a feature score corresponding to $V_j$, A, B, C, k1, and k2 are positive numbers, k1<k2, and A<B<C.

For example, k1=2, k2=3, A=5, B=10, and C=20. If $5<V_j\leq 10$, $scoreV_j=V_j-5$; if $10<V_j\leq 20$, $scoreV_j=2*(V-5)$; or if $20<V_j$, $scoreV_j=3*(V_j-5)$.

In addition, the eye opening feature may be determined by using a location of an eye feature point, and directly reflects an eye opening degree.

The feature is mainly calculated by using the location of the eye feature point, and directly reflects the eye opening degree.

Figure 7:
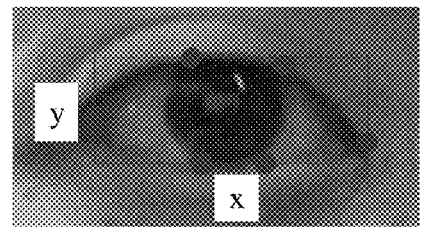
FIG. 7 is a schematic diagram of an eye opening feature according to an embodiment of this application.

FIG. 7 is a schematic diagram of determining the eye opening feature, where dx is a distance, in the horizontal direction, between two feature points locating canthi, and dy is a distance, in the vertical direction, between four feature points locating an eyeball. The eye opening feature is determined by using the following formula (2) or (3):

$$feature2 = \frac{dx}{dy}; \text{ and} \qquad (2)$$

$$feature2 = \frac{dy}{dx}, \qquad (3)$$

where feature2 represents the eye opening feature.

When this embodiment of this application is applied to a user skin detection solution, when the electronic device 100 identifies that the user triggers opening the skin detection application, the electronic device 100 displays a photographing preview interface on the display 194. The photographing preview interface displays the face image captured by using the camera lens. The electronic device 100 obtains the iris shape feature, the vertical direction feature, and the eye opening feature by using the solution provided in this embodiment of this application, and inputs the iris shape feature, the vertical direction feature, and the eye opening feature to the classification model, so that the eye open or closed state is output. For example, 1 is output to indicate the eye open state, and 0 is output to indicate the eye closed state. An OR operation may be performed on determining results of two eyes, to obtain and output a final eye state. To improve accuracy, in this embodiment of this application, if it is detected for a plurality of times that the user is in the eye open state, the user is prompted to close the eyes. If it is detected for a plurality of times (for example, three times) that the user is in the eye closed state, a subsequent skin detection item is entered. For example, the user may be prompted through voice to close the eyes, or the user may be prompted in a manner of sending an alert tone or in a vibrating manner, to close the eyes.

Figure 8:
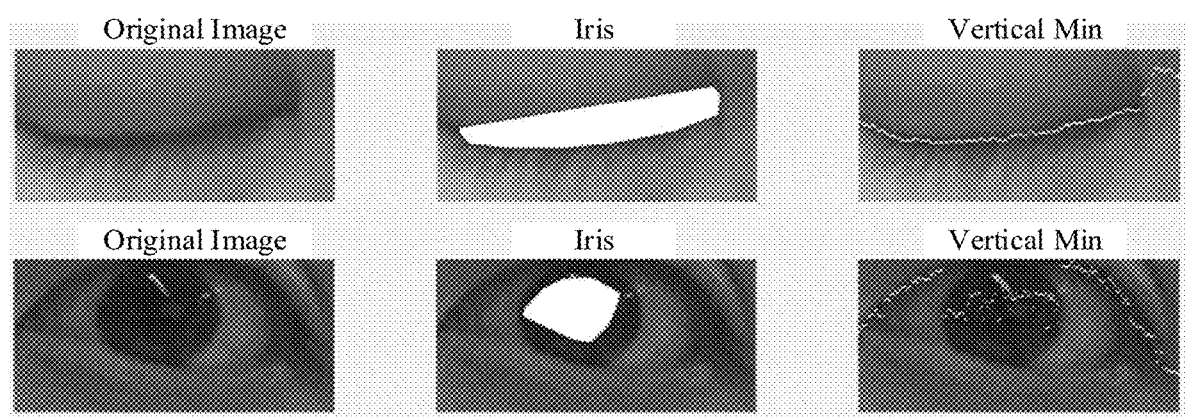
FIG. 8 is a schematic diagram of an application scenario according to an embodiment of the present invention.
Figure 9:
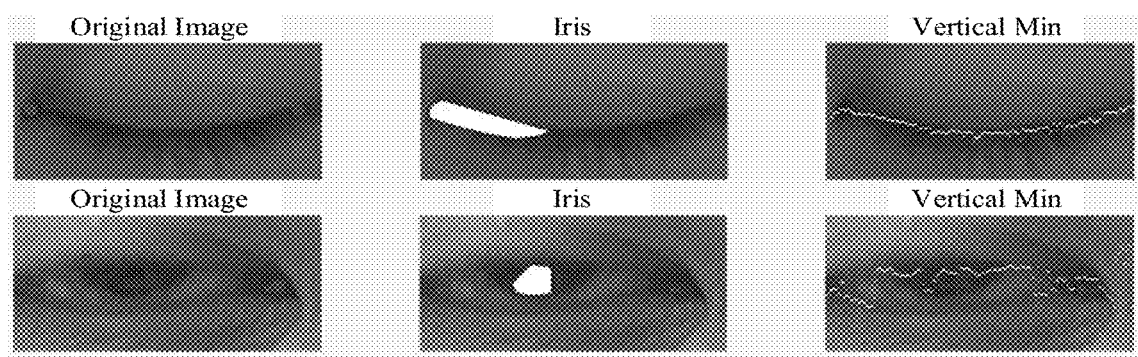
FIG. 9 is a schematic diagram of another application scenario according to an embodiment of the present invention.

FIG. 8 and FIG. 9 are schematic diagrams of calculating the three features. An eye open image in FIG. 9 shows a state near the indeterminate state, and the model has a relatively high identification difficulty. Table 1 and Table 2 respectively correspond to a feature calculation result and a classification model identification result of FIG. 8 and a feature calculation result and a classification model identification result of FIG. 8. That the classification model is an SVM model is used as an example herein. In the model, a distance from a sample to a decision plane in an eigenspace is calculated to determine a classification result.

TABLE 1

| Status | Eye opening | Iris shape | Vertical direction | Model identification result |
|---|---|---|---|---|
| Closed | 0.04 | 0.25 | 20.5 | 1 (closed) |
| Open | 0.33 | 0.72 | 453.1 | 0 (open) |

TABLE 2

| Status | Eye opening | Iris shape | Vertical direction | Model identification result |
|---|---|---|---|---|
| Closed | 0.11 | 0.36 | 4.5 | 1 (closed) |
| Open | 0.11 | 0.88 | 292.8 | 0 (open) |

The following briefly introduces the SVM. The following formulas (3) and (4) describe an optimization problem of a linear SVM model:

$$\arg^{min}_{(w,b)} \frac{1}{2}\|w\|^2. \quad (3)$$

In addition, the following formula is met:

$$y_t(w \cdot x_t - b) \geq 1 \quad (4).$$

arg( ) represents that an index of a condition in brackets is met. $\|w\|^2$ represents a 2-norm of w.

w is a normal vector of the SVM, b is a deviation value of the decision plane, $x_t$ is a vector formed by the foregoing three eye features, $y_t$ is a classification result (0 or 1), and t represents a number of the sample. A solution to the foregoing optimization problem is implemented by using formulas (5) and (6):

$$w = \Sigma_{t=1}^n \alpha_t y_t x_t \quad (5); \text{ and}$$

$$b = \frac{1}{m}\sum_{t=1}^{m}(w \cdot x_t - y_t), \quad (6)$$

where $\alpha_t$ is a lagrangian multiplier. n represents a quantity of samples, and m represents a quantity of support vectors.

When applied to a solution of photographing a person, this embodiment of this application is applied to a camera application. When the processor 110 identifies that the user triggers opening the camera application, the processor 110 displays the photographing preview interface on the display 194. The photographing preview interface displays the face image captured by using the camera lens. When receiving a photographing triggering instruction of the user, the processor 110 obtains the iris shape feature, the vertical direction feature, and the eye opening feature by using the solution provided in this embodiment of this application, and inputs the iris shape feature, the vertical direction feature, and the eye opening feature to the classification model, so that the eye open or closed state is output. For example, 1 is output to indicate the eye open state, and 0 is output to indicate the eye closed state. An OR operation may be performed on determining results of two eyes, to obtain and output a final eye state. If it is detected that the user is in the eye open state, photographing is performed. If it is detected that the user is in the eye closed state, no photographing is performed. The user may be further prompted through voice to open the eyes, or the user may be prompted in a manner of sending an alert tone or in a vibrating manner, to open the eyes.

Figure 10A:
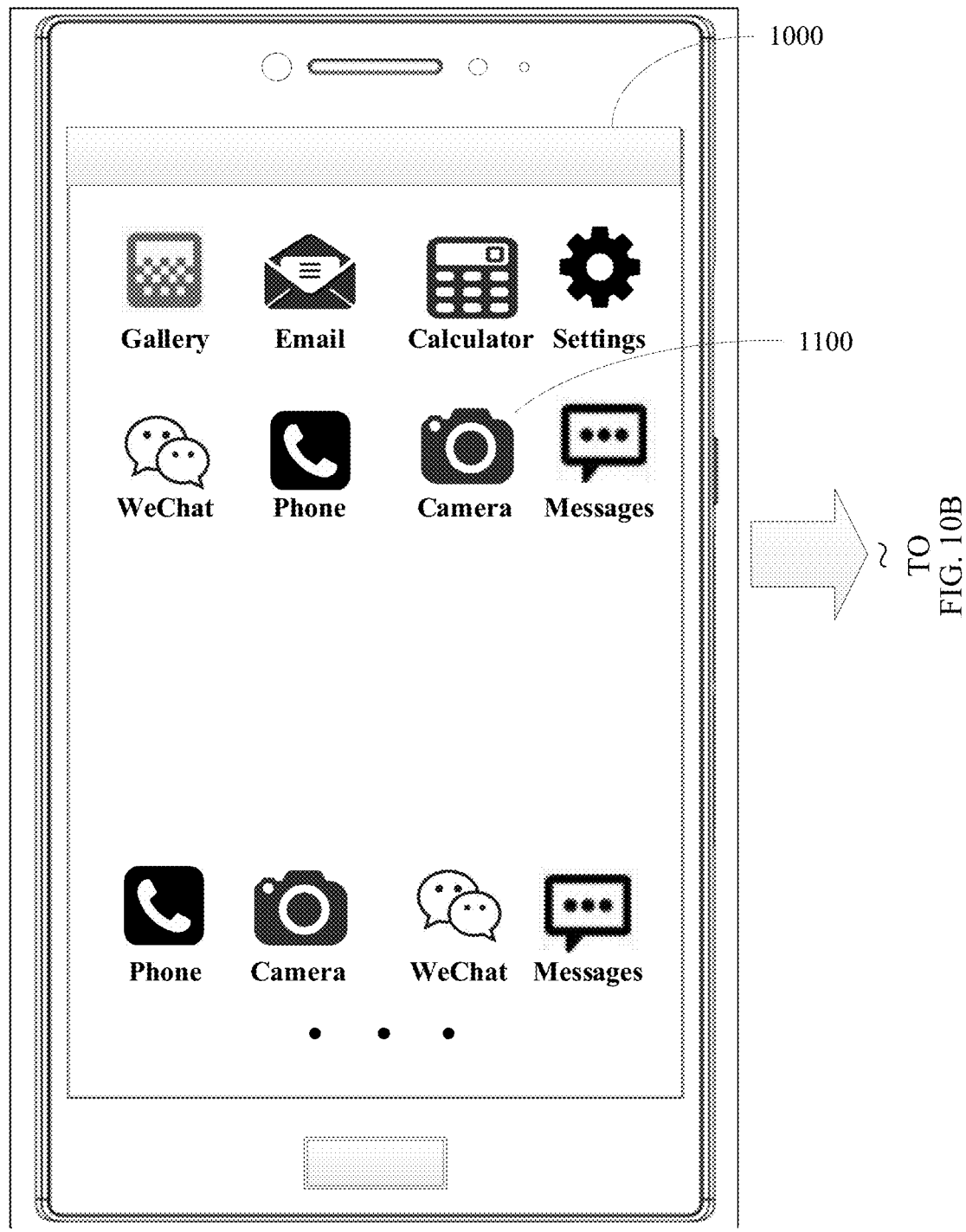
FIG. 10A to FIG. 10A are schematic diagrams of a photographing scenario according to an embodiment of the present disclosure.
Figure 10B:
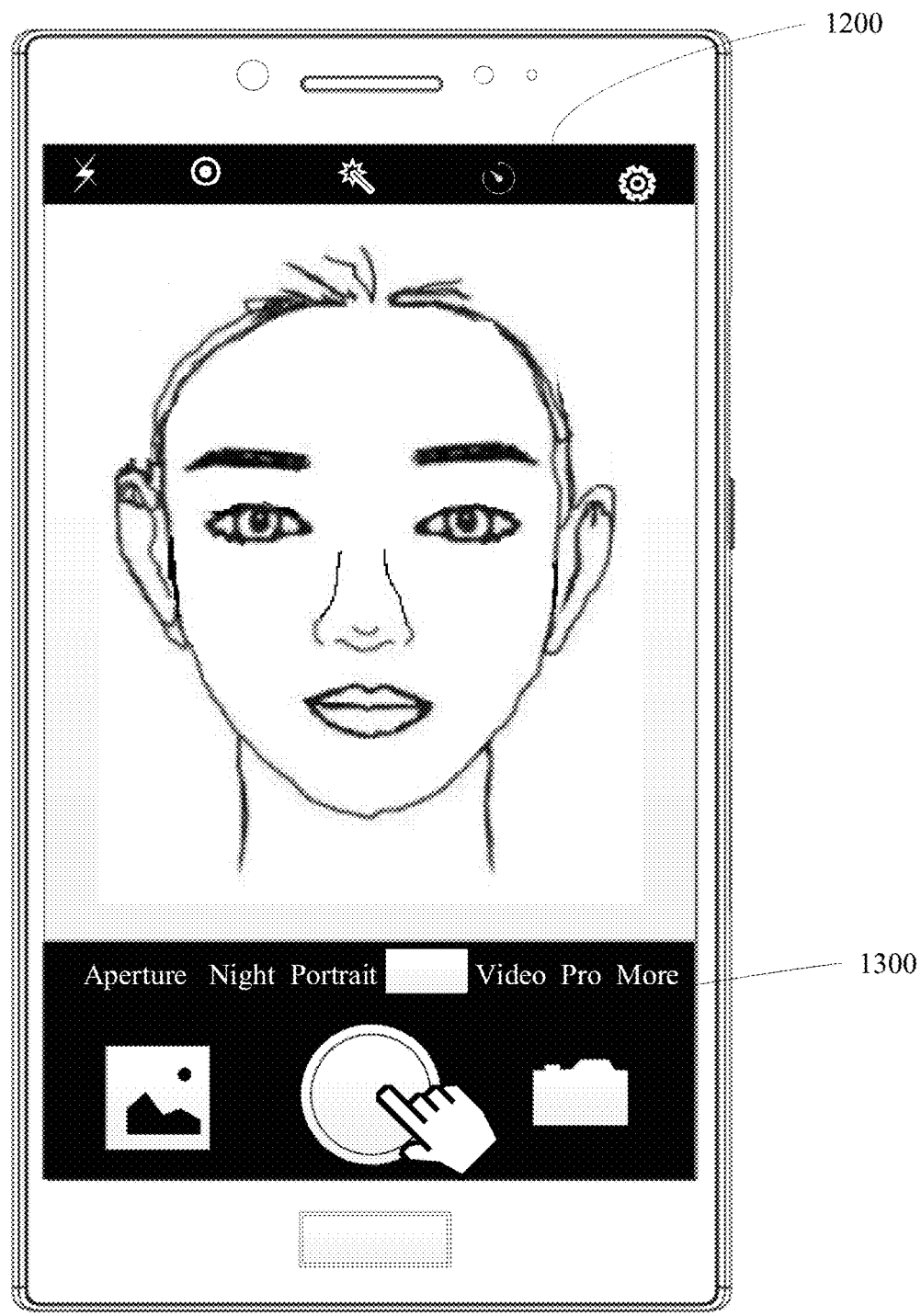
FIG. 10C to FIG. 10D are schematic diagrams of a setting interface of a camera application according to an embodiment of this application.
FIG. 10E to FIG. 10H are schematic diagrams of a setting interface of another camera application according to an embodiment of this application.

For example, as shown in FIG. 10A to FIG. 10B, a user interface 1000 displayed on the display 194 includes icons of applications installed in the electronic device 100, for example, gallery, e-mail, camera, and settings. The processor 110 displays a photographing preview interface 1200 on the display 194 in response to an operation on an icon 1100 of the camera on the user interface 1000. In response to an operation (for example, a touch operation) on a virtual button 1300 on the photographing preview interface 1200, if the user is in the eye open state in an image on the photographing preview interface 1200, the processor 110 automatically takes the image captured by using the camera lens 193.

In this embodiment of this application, an anti-eye closing function may be further configured. After the user opens photographing software, the anti-eye closing function is enabled. In response to the photographing triggering instruction of the user, if the electronic device detects that the user is in the eye closed state, the electronic device does not perform a photographing action, or if the electronic device detects that the user is in the eye open state, the electronic device executes a photographing command to perform photographing.

Figure 10C:
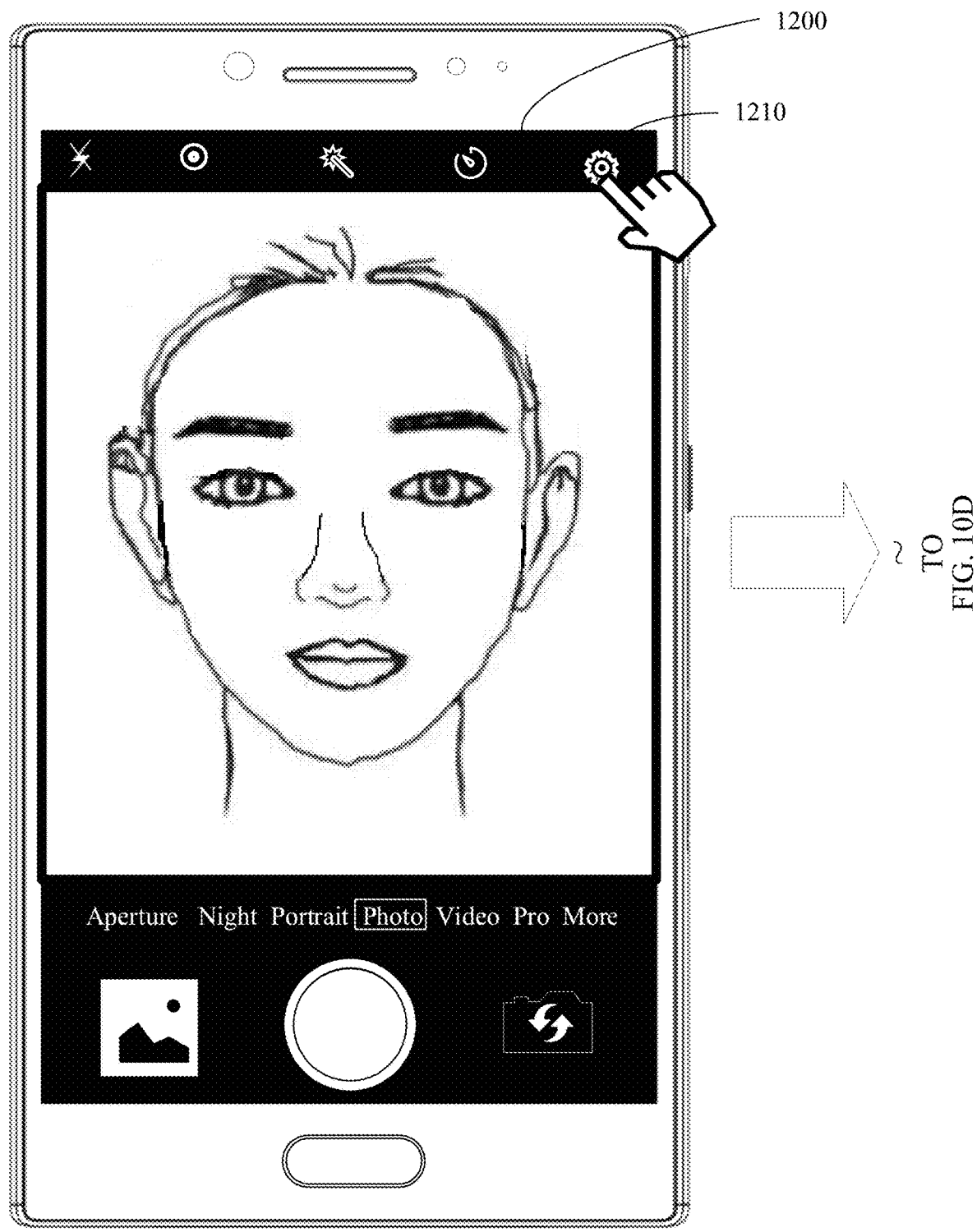
Figure 10D:
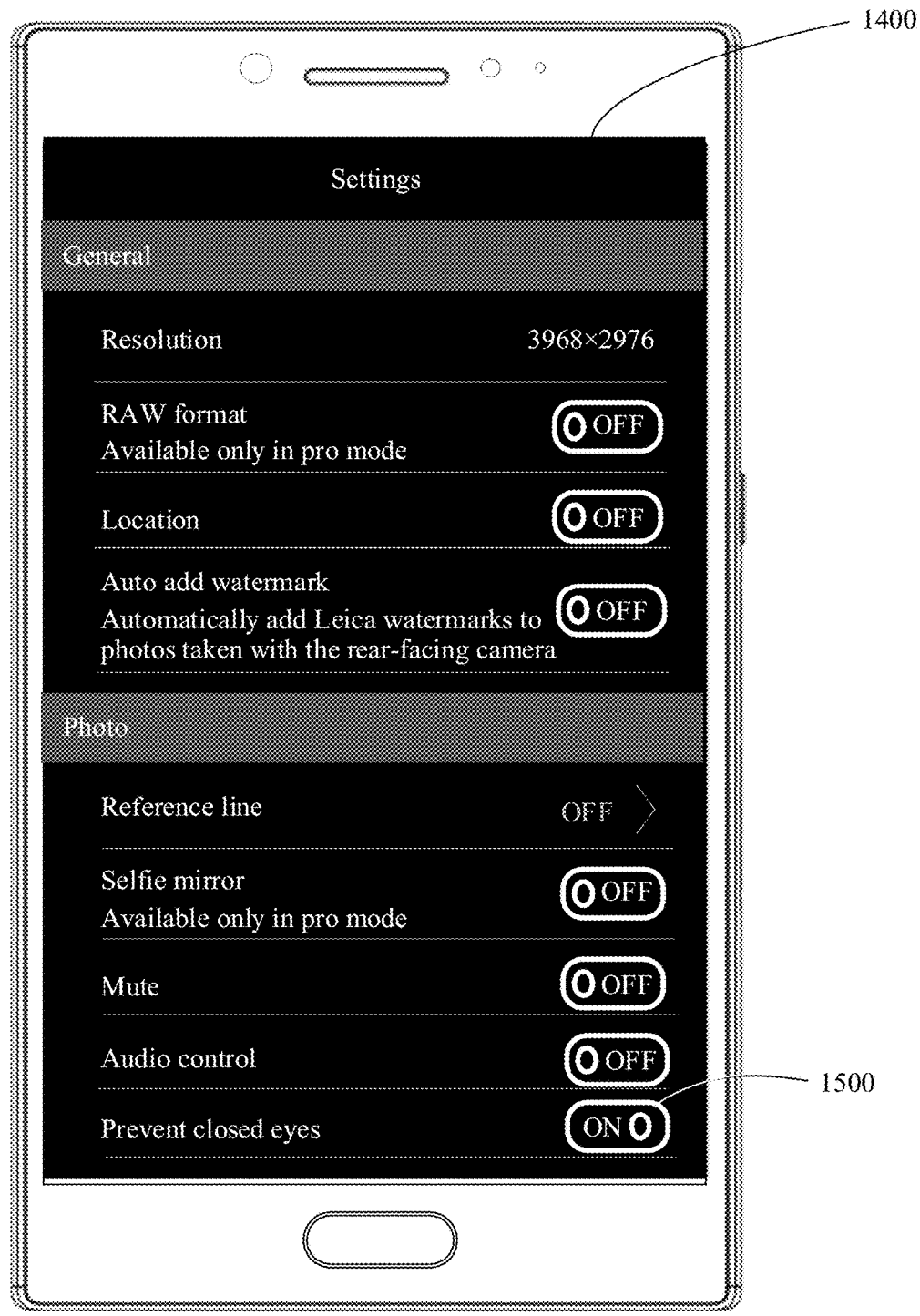
Figure 10E:
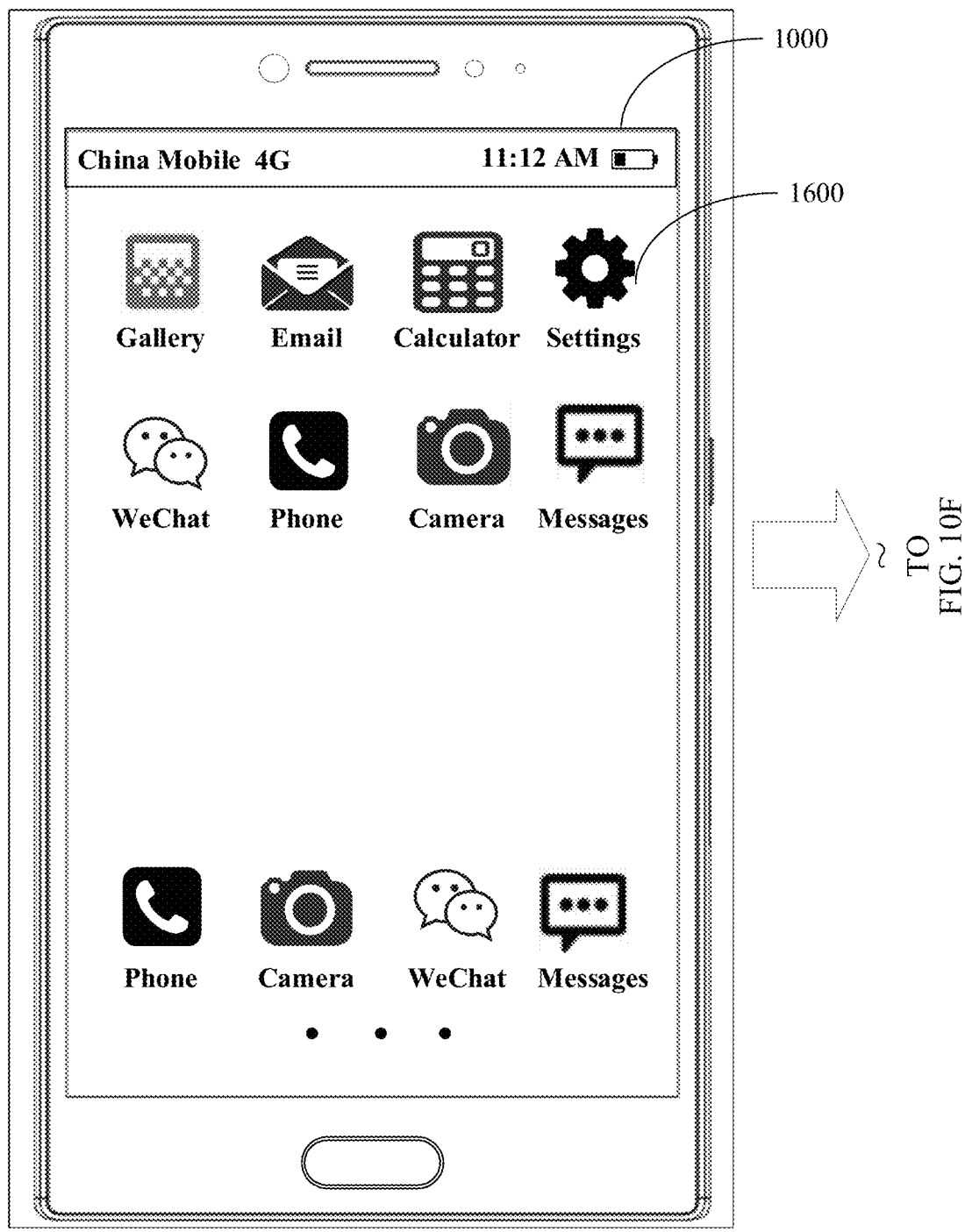
Figure 10F:
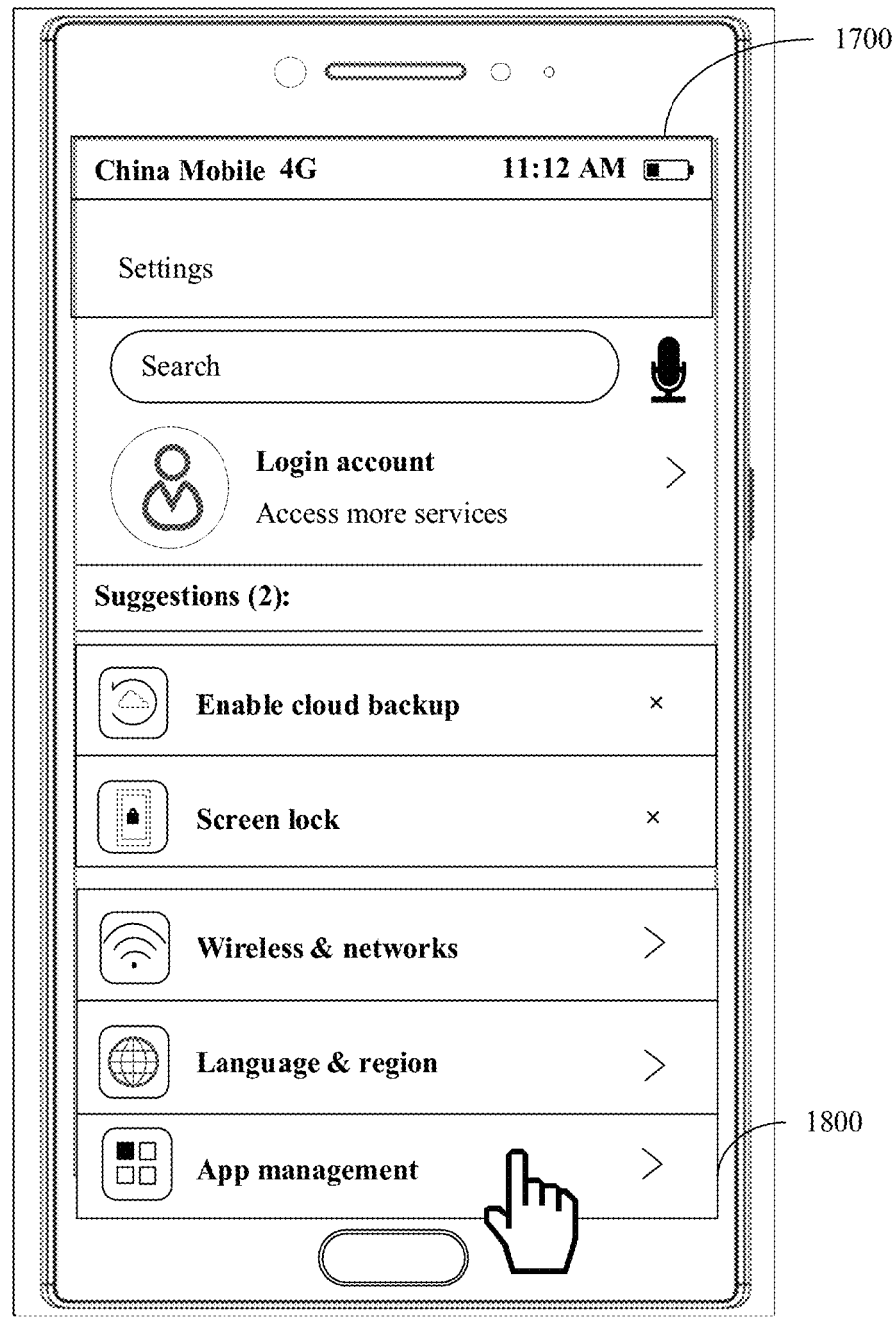
Figure 10G:
Figure 10H:
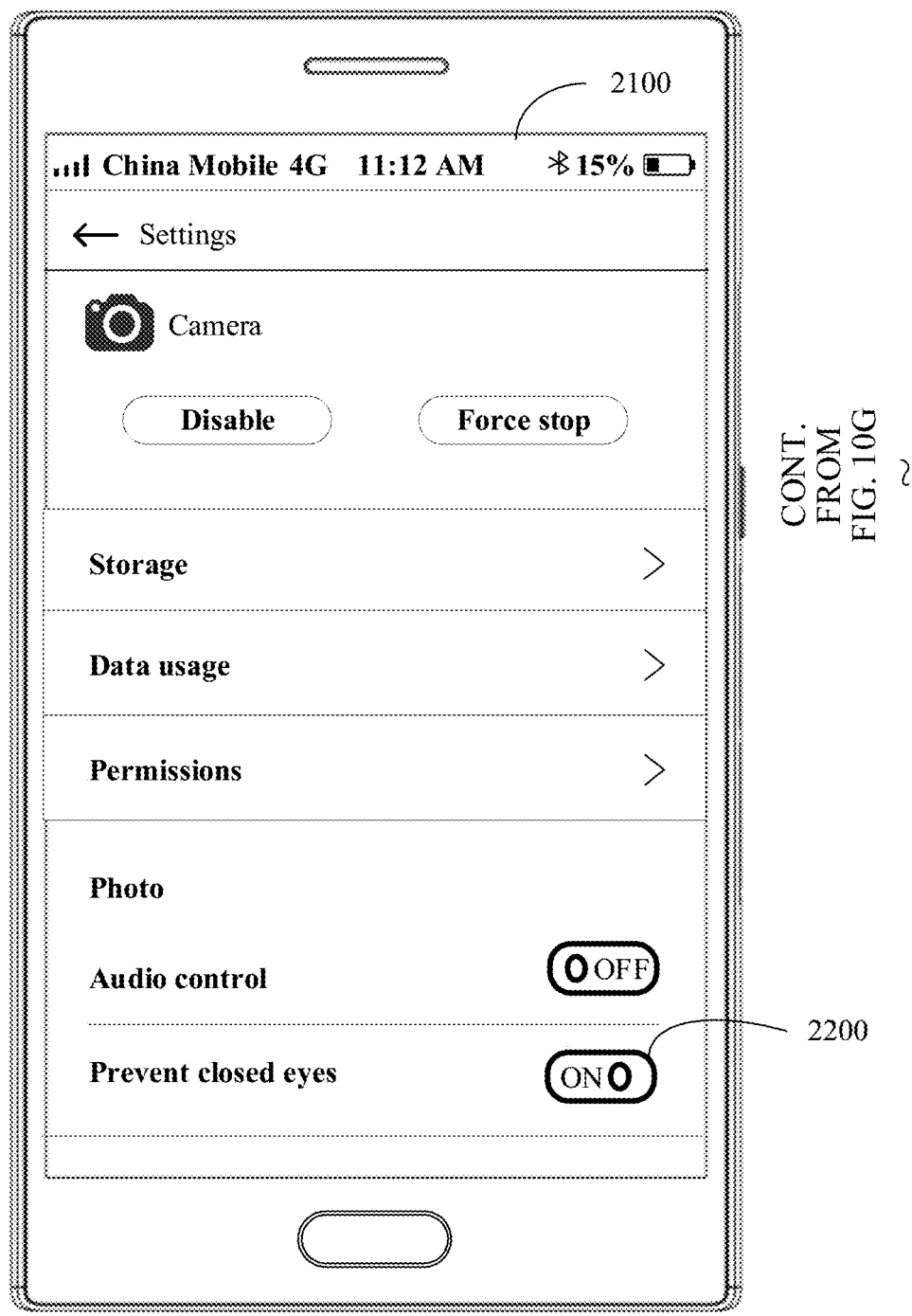

For example, as shown in FIG. 10C to FIG. 10D, a setting interface 1400 of the camera application may include some virtual buttons used to set photographing functions, for example, resolution and a mirror selfie. The processor 110 may display the setting interface 1400 of the camera application on the display 194 in response to an operation on a setting button 1210 on the photographing preview interface 1200. It should be noted that the processor 110 may further display the setting interface 1400 of the camera application on the display 194 in response to another operation (for example, sliding to the right or sliding to the left). For the convenience of the user to learn about the anti-eye closing function, an anti-eye closing virtual button 1500 may be added on the setting interface 1400 of the application. When the virtual button 1500 is ON (on), after the processor 110 displays the photographing preview interface 1200, the electronic device responds to an operation (for example, a touch operation) on the virtual button 1300 on the photographing interface 1200, and if the user is in the eye open state in an image on the photographing preview interface 1200, the processor 110 automatically takes the image captured by using the camera lens 193. When the virtual button 1500 is OFF (off), the processor 110 takes the image captured by using the camera lens 193, and may no longer detect whether the user is in the eye open state.

For another example, as shown in FIG. 10E to FIG. 10H, the processor 110 may display a system setting interface 1700 on the display 194 in response to an operation on an icon 1600 of settings on the user interface 1000. The processor 110 may display a user interface 1900 on the display 194 in response to an operation on application management 1800 included on the system setting interface 1700. The processor 110 may display a setting interface 2100 of the camera application on the display 194 in response to an operation of the user on an icon 2000 of the camera application. For the convenience of the user to learn about the anti-eye closing function, an anti-eye closing virtual button 2200 is added on the setting interface 2100 of the camera application. For a function of the virtual button 2200, refer to the function of the virtual button 1300. Details are not described herein again.

Figure 11:
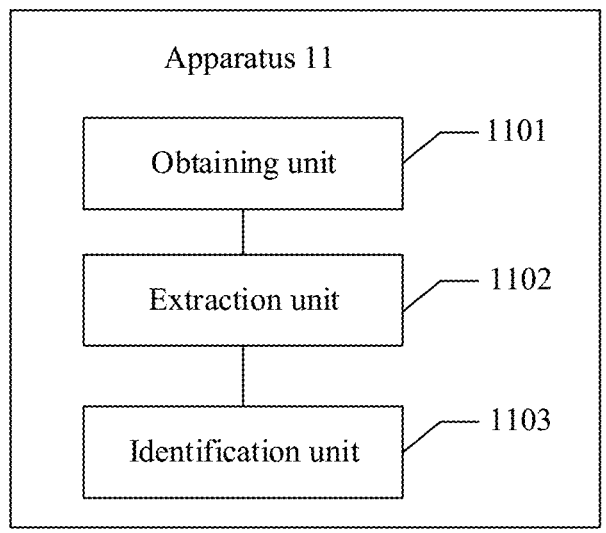
FIG. 11 is a schematic structural diagram of an apparatus 11 according to an embodiment of this application.

Based on an inventive idea the same as that of the method, an embodiment of this application further provides an apparatus 11. As shown in FIG. 11, the apparatus 1200 may be specifically a processor of an electronic device, a chip or a chip system, a module of an electronic device, or the like.

For example, the apparatus may include an obtaining unit 1101, an extraction unit 1102, and an identification unit 1103. The obtaining unit 1101, the extraction unit 1102, and the identification unit 1103 perform the method steps in the embodiments corresponding to FIG. 3A to FIG. 7. For example, the obtaining unit 1101 may be configured to obtain a face image, the extraction unit 1102 is configured to extract an eye feature in the face image, and the identification unit 1103 is configured to identify an eye open or closed state based on the eye feature.

Figure 12:
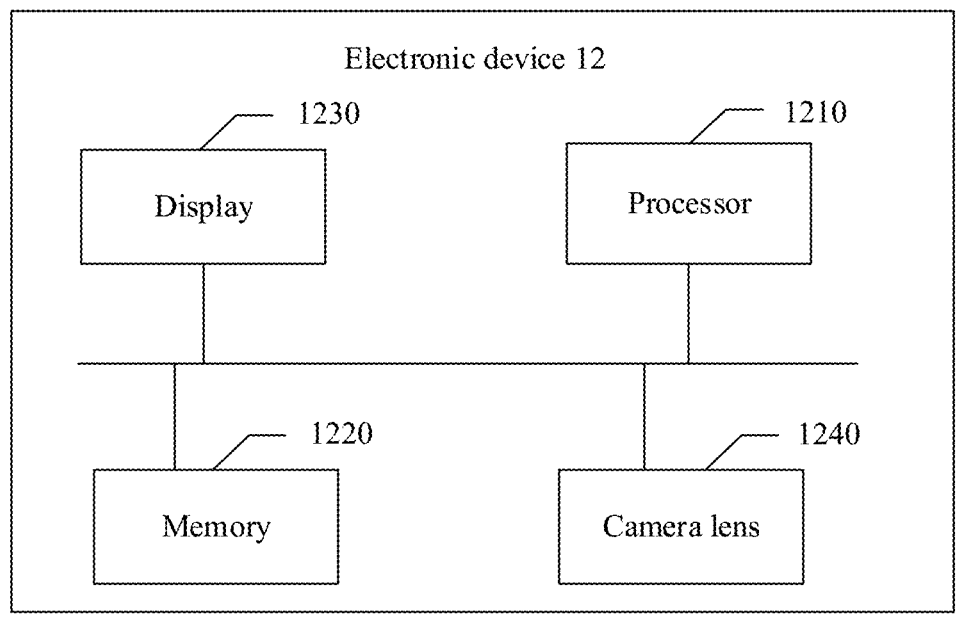
FIG. 12 is a schematic structural diagram of an electronic device 12 according to an embodiment of this application.

An embodiment of this application further provides an electronic device. As shown in FIG. 12, an electronic device 12 may include a processor 1210. Optionally, the electronic device 12 may further include a memory 1220. The memory 1220 may be disposed inside the electronic device 12, or may be disposed outside the electronic device 12. All of the obtaining unit 1101, the extraction unit 1102, and the identification unit 1103 in FIG. 11 may be implemented by using the processor 1210. Optionally, the apparatus 12 may further include a display 1230 and a camera lens 1240. The processor 1210 is coupled to the memory 1220, the display 1230, and the camera lens 1240. Coupling in this embodiment of this application means indirect coupling or communication connection between apparatuses, units, or modules, may be in an electrical form, a mechanical form, or another form, and is used to implement information exchange between the apparatuses, the units, or the modules. It should be noted that the display and the camera lens in this embodiment of this application may be located on the electronic device, or may not be located on the electronic device. For example, the display and/or the camera lens are connected to the electronic device as external devices.

Specifically, the memory 1220 is configured to store a program instruction. The display 1230 is configured to display a photographing preview interface, where the photographing preview interface includes an image captured by using the camera lens 1240. The processor 1210 is configured to invoke the program instruction stored in the memory 1220, so that the electronic device 1200 performs the steps performed by the electronic device in the eye open or closed state detection method in FIG. 3A to FIG. 11.

It should be understood that the electronic device 1200 may be configured to implement the eye open or closed state detection method in FIG. 3A to FIG. 11 in the embodiments of this application. For a related feature, refer to the foregoing description. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, and an optical memory) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the protection scope defined by the following claims and their equivalent technologies.

What is claimed is:

1. An eye open or closed state detection method, comprising:
    obtaining a grayscale image of an eye on a human face in a to-be-processed face image;
    extracting an eye feature from the grayscale image, wherein the eye feature comprises an eye opening feature, wherein the eye feature further comprises an iris shape feature or a vertical direction feature, wherein the eye opening feature represents an eye opening degree, wherein the iris shape feature represents a shape of the iris, and wherein the vertical direction feature represents a change degree of an eyelid curve;
    obtaining a plurality of smallest pixels in a first plurality of pixels comprised in the grayscale image, wherein a smallest pixel of the smallest pixels comprises a smallest pixel value in a second plurality of pixels with a same horizontal coordinate in an image coordinate system, and wherein a quantity of the smallest pixels is equal to a quantity of selected horizontal coordinates;
    obtaining the vertical direction feature based on vertical coordinates of the smallest pixels; and
    identifying an eye open state or an eye closed state based on the eye feature.

2. The eye open or closed state detection method of claim 1, further comprising:
    performing binarization processing on the grayscale image to obtain a binary image of the grayscale image;
    obtaining a convex set in a largest connected region of the binary image;
    obtaining distances, in a horizontal direction and a vertical direction of an image coordinate system, between every two pixels comprised in the convex set;
    determining a first largest distance of the distances in the horizontal direction;
    determining a second largest distance of the distances in the vertical direction; and
    determining the iris shape feature based on the first largest distance and the second largest distance, wherein the iris shape feature is a first ratio of the first largest distance to the second largest distance, a second ratio of the second largest distance to the first largest distance, or a smaller value of the first ratio and the second ratio.

3. The eye open or closed state detection method of claim 2, further comprising:

traversing the grayscale image based on a specified rectangular window and a specified sliding step;

determining an average pixel value of pixels in the specified rectangular window to obtain a plurality of average pixel values; and performing binarization processing on the grayscale image using a smallest pixel value in the average pixel values as a threshold.

4. The eye open or closed state detection method of claim 1, further comprising:

obtaining a plurality of absolute values of differences between vertical coordinates of every two pixels with adjacent horizontal coordinates in the smallest pixels;

determining a plurality of feature scores corresponding to each of the absolute values; and using a sum of the feature scores as the vertical direction feature.

5. The eye open or closed state detection method of claim 4, wherein a feature score $\text{score}V_j$ corresponding to an absolute value $V_j$ is based on the following:

if $A<V_j\leq B$, $\text{score}V_j=V_j-A$;

if $B<V_j\leq C$, $\text{score}V_j=k1*(V_j-A)$;

if $C<V_j$, $\text{score}V_j=k2*(V_j-A)$, wherein A, B, C, k1 and k2 are positive numbers, wherein k1<k2, and wherein A<B<C.

6. The eye open or closed state detection method of claim 1, further comprising:

obtaining a plurality of grayscale images of eyes on human faces in a plurality of face images in a face image training library;

extracting eye features corresponding to the grayscale images;

constructing a classification model based on the eye features and pre-marked eye open states or pre-marked eye closed states corresponding to the grayscale images; and identifying the eye open state or the eye closed state based on the eye features and the classification model.

7. An electronic device, comprising:

a processor; and a memory coupled to the processor and configured to store instructions that, when executed by the processor, cause the electronic device to be configured to:

obtain a grayscale image of an eye on a human face in a to-be-processed face image;

extract an eye feature from the grayscale image, wherein the eye feature comprises an eye opening feature, wherein the eye feature further comprises an iris shape feature or a vertical direction feature, wherein the eye opening feature represents an eye opening degree, wherein the iris shape feature represents a shape of the iris, and wherein the vertical direction feature represents a change degree of an eyelid curve;

obtain a plurality of smallest pixels in a first plurality of pixels comprised in the grayscale image, wherein a smallest pixel of the smallest pixels comprises a smallest pixel value in a second plurality of pixels with a same horizontal coordinate in an image coordinate system, and wherein a quantity of the smallest pixels is equal to a quantity of selected horizontal coordinates;

obtain the vertical direction feature based on vertical coordinates of the smallest pixels; and identify an eye open state or an eye closed state based on the eye feature.

8. The electronic device of claim 7, wherein the instructions further cause the electronic device to be configured to:

perform binarization processing on the grayscale image to obtain a binary image of the grayscale image;

obtain a convex set in a largest connected region of the binary image;

obtain distances, in a horizontal direction and a vertical direction of an image coordinate system, between every two pixels comprised in the convex set;

determine a first largest distance of the distances in the horizontal direction;

determine a second largest distance of the distances in the vertical direction; and determine the iris shape feature based on the first largest distance and the second largest distance, wherein the iris shape feature is a first ratio of the first largest distance to the second largest distance, a second ratio of the second largest distance to the first largest distance, or a smaller value of the first ratio and the second ratio.

9. The electronic device of claim 8, wherein the instructions further cause the electronic device to be configured to:

traverse the grayscale image based on a specified rectangular window and a specified sliding step;

determine an average pixel value of pixels in the specified rectangular window to obtain a plurality of average pixel values; and perform binarization processing on the grayscale image using a smallest pixel value in the average pixel values as a threshold.

10. The electronic device of claim 7, wherein the instructions further cause the electronic device to be configured to:

obtain a plurality of absolute values of differences between vertical coordinates of every two pixels with adjacent horizontal coordinates in the smallest pixels;

determine a plurality of feature scores corresponding to each of the absolute values; and use a sum of the feature scores as the vertical direction feature.

11. The electronic device of claim 10, wherein a feature score $\text{score}V_j$ corresponding to an absolute value $V_j$ is based on the following:

if $A<V_j\leq B$, $\text{score}V_j=V_j-A$;

if $B<V_j\leq C$, $\text{score}V_j=k1*(V_j-A)$;

if $C<V_j$, $\text{score}V_j=k2*(V_j-A)$, wherein A, B, C, k1 and k2 are positive numbers, wherein k1<k2, and wherein A<B<C.

12. The electronic device of claim 7, wherein the instructions further cause the electronic device to be configured to:

obtain a plurality of grayscale images of eyes on human faces in a plurality of face images in a face image training library;

extract eye features corresponding to the grayscale images;

construct a classification model based on the eye features and pre-marked eye open states or pre-marked eye closed states corresponding to the grayscale images; and identify the eye open state or the eye closed state based on the eye features and the classification model.

13. A computer program product comprising computer-executable instructions stored on a non-transitory computer-readable medium that, when executed by a processor, cause an electronic device to:

obtain a grayscale image of an eye on a human face in a to-be-processed face image;

extract an eye feature from the grayscale image, wherein the eye feature comprises an eye opening feature, wherein the eye feature further comprises an iris shape feature or a vertical direction feature, wherein the eye opening feature represents an eye opening degree, wherein the iris shape feature represents a shape of the iris, and wherein the vertical direction feature represents a change degree of an eyelid curve;

obtain a plurality of smallest pixels in a first plurality of pixels comprised in the grayscale image, wherein a smallest pixel of the smallest pixels comprises a smallest pixel value in a second plurality of pixels with a same horizontal coordinate in an image coordinate system, and wherein a quantity of the smallest pixels is equal to a quantity of selected horizontal coordinates;

obtain the vertical direction feature based on vertical coordinates of the smallest pixels; and identify an eye open state or an eye closed state based on the eye feature.

14. The computer program product of claim 13, wherein the instructions further cause the electronic device to:

perform binarization processing on the grayscale image to obtain a binary image of the grayscale image;

obtain a convex set in a largest connected region of the binary image;

obtain distances, in a horizontal direction and a vertical direction of an image coordinate system, between every two pixels comprised in the convex set;

determine a first largest distance of the distances in the horizontal direction;

determine a second largest distance of the distances in the vertical direction; and determine the iris shape feature based on the first largest distance and the second largest distance, wherein the iris shape feature is a first ratio of the first largest distance to the second largest distance, a second ratio of the second largest distance to the first largest distance, or a smaller value of the first ratio and the second ratio.

15. The computer program product of claim 14, wherein the instructions further cause the electronic device to:

traverse the grayscale image based on a specified rectangular window and a specified sliding step;

determine an average pixel value of pixels in the specified rectangular window to obtain a plurality of average pixel values; and perform binarization processing on the grayscale image by using a smallest pixel value in the average pixel values as a threshold.

16. The computer program product of claim 13, wherein the instructions further cause the electronic device to:

obtain a plurality of absolute values of differences between vertical coordinates of every two pixels with adjacent horizontal coordinates in the smallest pixels;

determine a plurality of feature scores corresponding to each of the absolute values; and use a sum of the feature scores as the vertical direction feature.

17. The computer program product of claim 13, wherein the instructions further cause the electronic device to:

obtain a plurality of grayscale images of eyes on human faces in a plurality of face images in a face image training library;

extract eye features corresponding to the grayscale images;

construct a classification model based on the eye features and pre-marked eye open or pre-marked eye closed states corresponding to the grayscale images; and identify the eye open state or the eye closed state based on the eye features and the classification model.

* * * * *

UNITED STATES PATENT AND TRADEMARK OFFICE
CERTIFICATE OF CORRECTION

PATENT NO. : 11,430,264 B2
APPLICATION NO. : 17/260859
DATED : August 30, 2022
INVENTOR(S) : Hongbao Li et al.

It is certified that error appears in the above-identified patent and that said Letters Patent is hereby corrected as shown below:

On the Title Page

Item (57) Abstract should read: "In an eye open or closed state detection method, in addition to an eye opening feature, an iris shape feature and/or a vertical direction feature are added to identify the eye open or closed state, where the eye opening feature is used to represent an eye opening degree, the iris shape feature is used to represent a shape of an iris of an eye, and the vertical direction feature is used to represent a change degree of an eyelid curve."

Signed and Sealed this
Eighth Day of November, 2022

Katherine Kelly Vidal
*Director of the United States Patent and Trademark Office*